United States Patent
Natori

(10) Patent No.: US 8,412,038 B2
(45) Date of Patent: Apr. 2, 2013

(54) OPTICAL TRANSMISSION DEVICE, OPTICAL TRANSMISSION SYSTEM INCLUDING THE SAME, AND OPTICAL TRANSMISSION METHOD

(75) Inventor: Hidezumi Natori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 12/707,841

(22) Filed: Feb. 18, 2010

(65) Prior Publication Data

US 2010/0232782 A1    Sep. 16, 2010

(30) Foreign Application Priority Data

Mar. 10, 2009   (JP) ................. 2009-057060

(51) Int. Cl.
  G02F 1/00  (2006.01)
  G02F 2/00  (2006.01)
  H01S 3/00  (2006.01)
  H04B 10/00 (2006.01)
  H04J 14/00 (2006.01)

(52) U.S. Cl. ................. 398/2; 398/1; 398/5; 398/7

(58) Field of Classification Search .............. None
See application file for complete search history.

(56) References Cited

U.S. PATENT DOCUMENTS

| 6,081,359 A | 6/2000 | Takehana et al. |
| 2004/0190446 A1* | 9/2004 | Ansorge et al. ............. 370/228 |
| 2006/0120718 A1* | 6/2006 | Natori ........................... 398/19 |
| 2010/0027989 A1* | 2/2010 | Lewis et al. .................... 398/2 |

FOREIGN PATENT DOCUMENTS

| EP | 1 021 011 A2 | 7/2000 |
| JP | 10-210008 | 8/1998 |
| JP | 2000-209244 | 7/2000 |
| JP | 2006-166037 | 6/2006 |

* cited by examiner

Primary Examiner — Kenneth N Vanderpuye
Assistant Examiner — Darren E Wolf
(74) Attorney, Agent, or Firm — Staas & Halsey LLP

(57) ABSTRACT

An optical transmission device includes a wavelength multiplexing/demultiplexing unit, a plurality of transponders, an optical switch unit and a controller. The controller includes a table in which a plurality of items at least including priority order, a transmission label, a receiving label and a receiving label expected value correspond to the respective transponders. And the controller rewrites the transmission label of the transponder corresponding to the client device of the lower priority order than the priority order of the client device connected to the transponder of the irregular input, upon the optical signal provided by the wavelength multiplexing/demultiplexing unit to one of the transponders being irregular, and controls the label-changed transponder for which the transmission label has been rewritten so that the label-changed transponder provides the wavelength multiplexing/demultiplexing unit with the optical signal including the rewritten transmission label.

10 Claims, 24 Drawing Sheets

60: OPTICAL BRANCH UNIT

FIG. 18
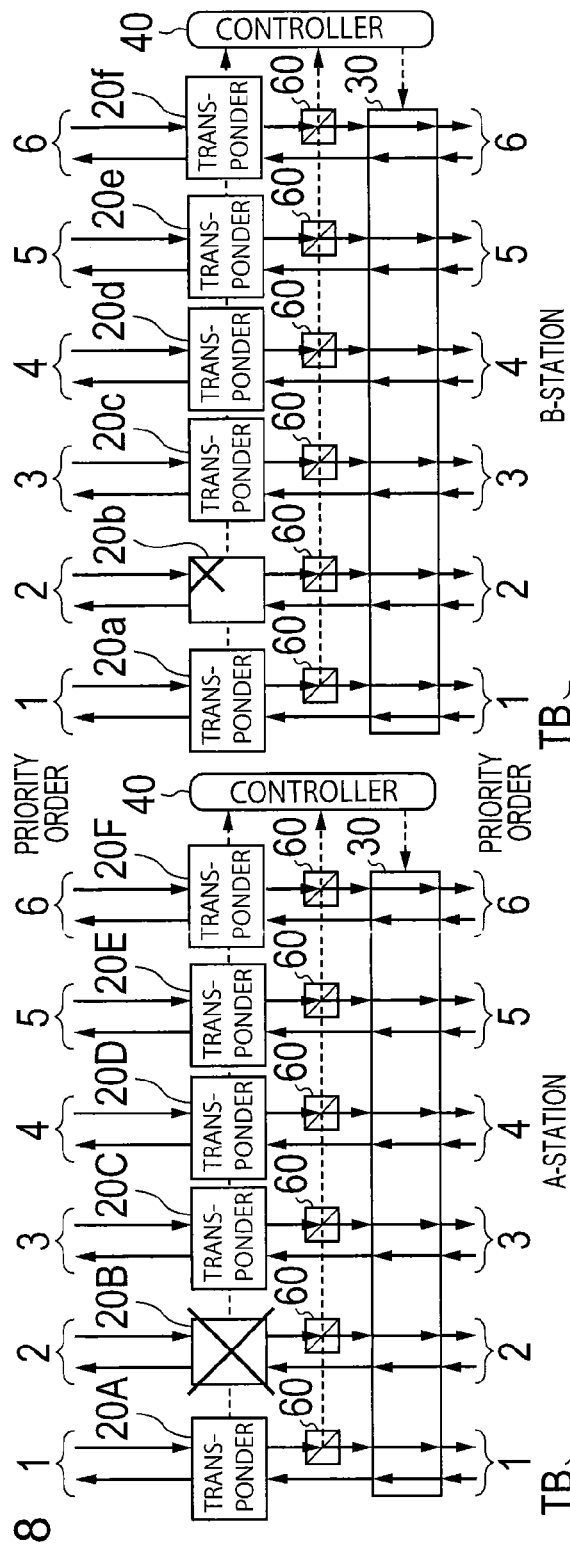
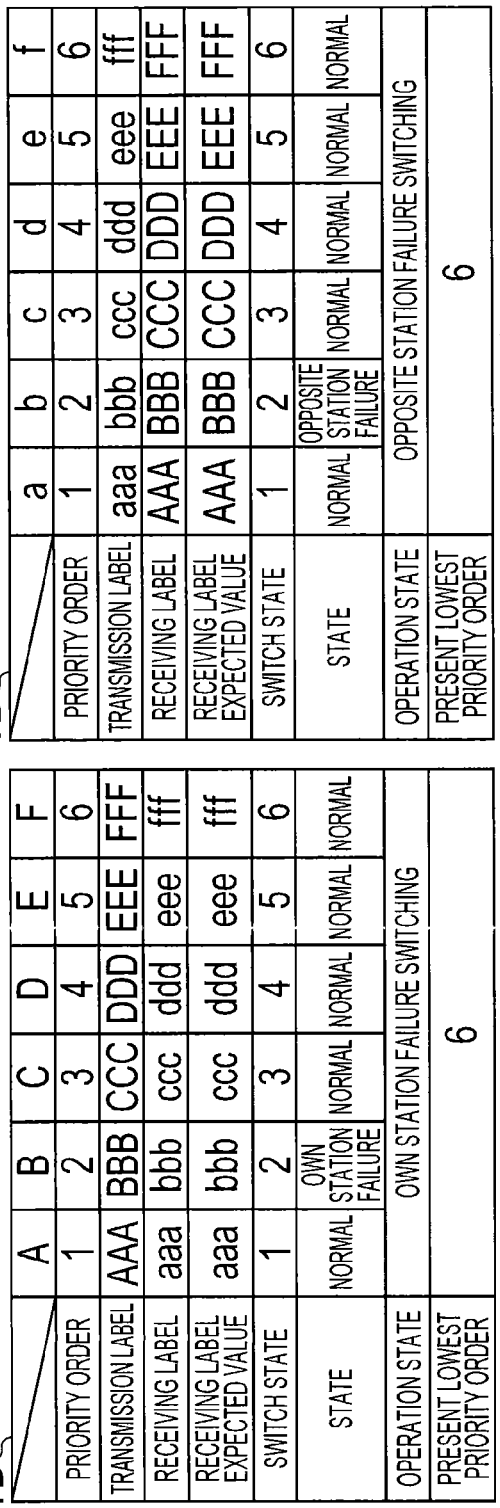

OPTICAL TRANSMISSION DEVICE, OPTICAL TRANSMISSION SYSTEM INCLUDING THE SAME, AND OPTICAL TRANSMISSION METHOD

CROSS-REFERENCE TO RELATED APPLICATION

This application is based upon and claims the benefit of priority of the prior Japanese Patent Application No. 2009-057060, filed on Mar. 10, 2009, the entire contents of which are incorporated herein by reference.

FIELD

The embodiments discussed herein are related to an optical transmission apparatus which transmits and receives an optical wavelength division multiplexing (WDM: Wavelength Division Multiplexing) signal.

BACKGROUND

As the Internet becomes widespread in recent years, optical transmission technology for transmitting large-capacity signals over a long distance is desired and optical transmission technology of a WDM system comes into wide use. As transmission capacity of respective wavelengths of a WDM signal becomes large, a large amount of data is damaged even owing to a failure that occurs on one wavelength. Thus, in order to avoid damage to data, an optical fiber of a transmission line or an optical transmission device which transmits and receives a WDM signal through the transmission line puts in redundancy so as to be substituted with a backup and saved if a failure occurs.

An optical transmission device provided to an optical transmission system such as a node of a WDM network has a transponder (wavelength transformer) for every wavelength which transforms an optical signal emitted from a client device (optical transceiver) into a wavelength suited to wavelength division multiplexing, wavelength division multiplexes the optical signal wavelength-transformed by the transponder by using a multiplexer (wavelength division multiplexer), and provides a transmission line with a WDM signal. Further, a WDM signal received from the transmission line is separated for each of the wavelengths, and the separated signals are respectively wavelength-transformed by the transponder, and then provided to the client device.

It is generally known as a redundant configuration of such an optical transmission device to provide a backup transponder extra in addition to a plurality of transponders provided for respective wavelengths, e.g., as disclosed in Japanese Laid-open Patent Publication No. 10-210008.

Redundancy of the optical transmission device having such a redundant configuration, however, depends on the number of backup transponders. That is, if just one backup transponder is provided, one wavelength only can be substituted and be saved, and failures occurring to a plurality of transponders cannot be dealt with. If redundancy is under consideration and more backup transponders are provided, however, equipment cost resultantly increases.

Thus, it is disclosed in Japanese Laid-open Patent Publication No. 2006-166037 that an optical transmission device is provided with an optical switch unit configured to change a connection path between a transponder and a client device so as to substitute and save an optical signal in failure by switching of the optical switch unit. That is a substitute-and-save technology for stopping transmission of an optical signal of a lower priority than an optical signal in failure, and switching the optical switch unit so that the transponder of the stopped optical signal is used for transmission of the optical signal in failure.

According to the technology disclosed in Japanese Laid-open Patent Publication No. 2006-166037, as an own station cannot share information as to switching of the switch unit with an opposite station, each of the stations cannot know in which priority order the transponder that the other station uses as a substitute is ranked. Thus, the stations need to make an arrangement with each other in advance as to substitute order such as from which transponder each of the stations uses as a substitute.

In this case, e.g., if failures occur on optical signals of the first and second priority orders at the same time, which of the fifth priority and the sixth priority is assigned to which of the first priority and the second priority as a substitute may possibly disagree between the two stations.

SUMMARY

According to an aspect of the invention, an optical transmission device includes a wavelength multiplexing/demultiplexing unit operable to multiplex a plurality of optical signals of different wavelengths to transmit a wavelength division multiplexing (WDM) signal to a transmission line, and demultiplexing the WDM signal received from the transmission line into a plurality of optical signals of respective wavelengths, a plurality of transponders for converting wavelengths of the respective optical signals provided from a plurality of client devices to provide the wavelength multiplexing/demultiplexing unit with the wavelength-converted optical signals, and converting wavelengths of the respective optical signals provided from the wavelength multiplexing/demultiplexing unit to provide the respective client devices with the wavelength-converted optical signals, an optical switch unit for switching connection paths between the transponders and the client devices, and a controller for switching the optical switch unit, upon a failure occurring on one of the transponders, to connect another transponder connected to the client device of lower priority than the priority of the client device connected to the transponder in failure. The controller includes a table in which a plurality of items at least including priority order, a transmission label, a receiving label and a receiving label expected value correspond to the respective transponders. The controller rewrites the transmission label of the transponder corresponding to the client device of the lower priority than the priority of the client device connected to the transponder of the irregular input in the table, upon the optical signal provided by the wavelength multiplexing/demultiplexing unit to one of the transponders being irregular, and controls the label-changed transponder for which the transmission label has been rewritten so that the label-changed transponder provides the wavelength multiplexing/demultiplexing unit with the optical signal including the rewritten transmission label.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 18 illustrates yet another state of the optical transmission device in failure which is different from those illustrated in FIG. 3 and FIG. 15.

DESCRIPTION OF EMBODIMENTS

An optical transmission device described below performs a saving process, if a failure occurs on one of a plurality of transponders, by substituting the transponder in failure with a transponder connected to a client device of a lower priority order than a client device connected to the transponder in failure. Thus, the optical transmission device can perform a substitute-and-save process without being provided with a backup transponder. In a case where a backup transponder is provided, the optical transmission device can perform a substitute-and-save process at least once for every transponder upon being provided with just one backup transponder.

Further, an own station and an opposite station can notify each other of a failure occurrence by means of the optical transmission device described below by using a WDM signal for communicating with each other. Assume, e.g., that an optical signal of one of wavelengths of a WDM signal received by the optical transmission device is in failure. On one of transponders of the optical transmission device corresponding to an optical signal other than the optical signal being in failure, a transmission label is intentionally rewritten. A WDM signal including the optical signal of label disagreement is thereby produced and transmitted to the opposite station. The transmission of the WDM signal causes the optical transmission device of the opposite station to detect the label disagreement, and to recognize the failure occurrence of the transponder. The optical transmission device of the opposite station switches an optical switch unit in response to the above, and substitute-and-save process can thereby be performed for the transponder in failure.

Meanwhile, if a failure occurs on an optical signal of one of wavelengths of an optical transmission device and causes a transponder of the optical signal to provide no output, and if an optical transmission device of an opposite station performs a control process for producing the above label disagreement, a WDM signal including an optical signal of label disagreement is received so that it can be checked that the opposite station can recognize the failure occurrence on the own station. Thus, the optical switch unit is switched so that a substitute-and-save process can be performed for the transponder in failure.

It is expected to reduce cost of a WDM optical transmission system equipped with a function for protecting against failure by performing such control.

Figure 1A:
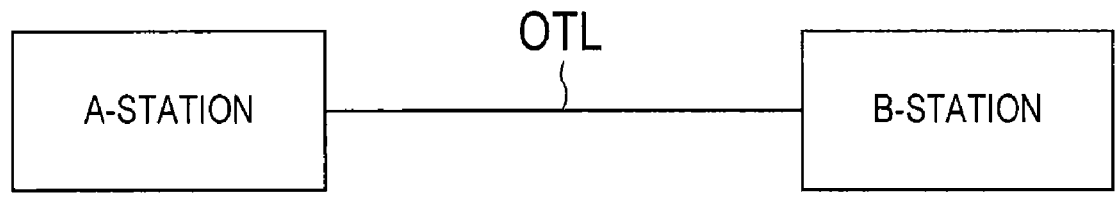
FIG. 1A illustrates an example of an optical transmission system

FIG. 1A illustrates an example of an optical transmission system that uses an optical transmission device. That is, an A-station and a B-station each equipped with an optical transmission device are one-to-one (Point-to-Point) connected to each other through an optical transmission line OTL that uses an optical fiber cable, and a WDM signal is transmitted and received between the A-station and the B-station through the optical transmission line OTL. Incidentally, the A-station and the B-station are not limited to ones one-to-one connected to each other, and may be nodes of a ring type network and so on.

Figure 1B:
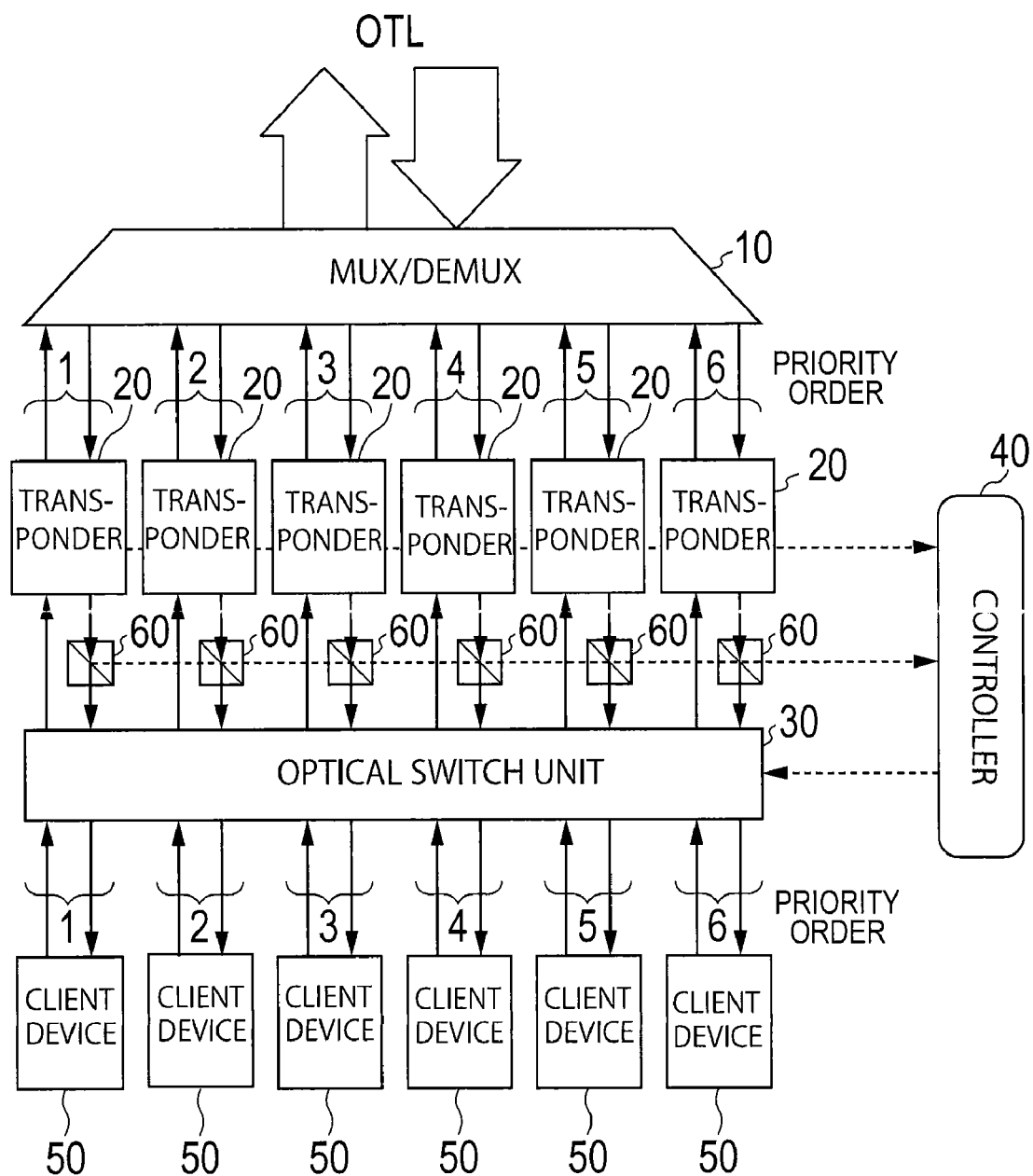
FIG. 1B is a block diagram illustrating an embodiment of an optical transmission device provided to the A-station and B-station of the optical transmission system illustrated in FIG. 1A.

FIG. 1B is a block diagram showing an embodiment of an optical transmission device provided to the A- and B-stations of the optical transmission system illustrated in FIG. 1A.

The optical transmission device of the embodiment has a wavelength division multiplex unit 10 which transmits and receives WDM signals to and from the optical transmission line OTL, a plurality of transponders 20 each provided for each individual wavelength (channel), an optical switch unit 30 using, e.g., a MEMS (Micro Electro Mechanical Systems) switch, and a controller 40 controls switching of the optical switch unit 30 in accordance with a state of the transponder 20.

The wavelength division multiplex unit 10 wavelength-multiplexes optical signals of different wavelengths provided from the individual transponders 20 to form a WDM signal, and transmits the WDM signal to the transmission line OTL of an optical fiber network. Further, the wavelength division multiplex unit 10 divides a WDM signal received from the transmission line OTL into optical signals of individual wavelengths, and provides the individual transponders 20 of the different wavelengths with respective optical signals.

The transponders 20 as many as the wavelengths to be multiplexed as a WDM signal are provided, and each of the transponders 20 changes an optical signal provided from a client device 50 through the optical switch unit 30 to a signal of a certain wavelength, and provides the wavelength division multiplex unit 10 with the signal of the changed wavelength. Further, the transponder 20 changes a wavelength of a signal provided from the wavelength division multiplex unit 10 to a wavelength adapted for the client device 50, and provides the corresponding client device 50 with the signal of the changed wavelength through the optical switch unit 30. The transponders 20 each report own states to the controller 40. Further, an optical branch unit 60 is provided on each of output paths from the transponders 20 to the client devices 50, and the optical signal provided from the transponder 20 partially branches off for watching operation of the controller 40.

The optical switch unit 30 switches a connection path between the transponder 20 and the client device 50 as controlled by the controller 40. Owing to the switch operation of the optical switch unit 30, one of the client devices 50 connected to one of the transponders 20 can be chosen from all the client devices 50.

The controller 40 has a rewritable table TB (refer to FIGS. 2-23) stored in a memory and so on and including a priority order, a transmission label of a trace identifier (an identification label carried by a transmitted optical signal), a receiving label (an identification label of an actually received optical signal) and a receiving label expected value (an identification label of an optical signal ought to be received) which correspond to every one of the transponders 20. The controller 40 controls the optical switch unit 30 with reference to the table TB. The trace identifier is specified by ITU-T (International Telecommunication Union Telecommunication Standardization Sector) G. 709, GR-253 (Bellcore)/ITU-TG. 707 (SONET/SDH), and is a message put on an optical signal by the transponder 20. If the identification label=the receiving label of an optical signal provided from the wavelength division multiplex unit 10 to the transponder 20 differs from the receiving label expected value, a warning of trace identifier disagreement is supposed to be issued. Incidentally, according to the embodiment, the above specified trace identifier is used so that an identifier of an optical signal is transferred to an opposite optical transmission device. How to transfer that is not limited to the above, and another wavelength for transferring a signal for monitoring and control may be prepared, e.g., so that a label of an optical signal can be transferred.

The table TB according to the embodiment of the controller 40 of each of the stations includes the priority order, the transmission label, the receiving label, the receiving label expected value, a switch state of the optical switch unit 30 for each of the transponders 20 (a state of a connection path), and a present state of each of the transponders 20 (normal or irregular, etc.) which are written in the table in correspondence with each of the transponders 20A-F and 20a-f for respective wavelengths. Further, data of operation states of the own station and the opposite station and of present lowest priority order are also written in the table. The controller 40 identifies a change concerning the transponders 20 with reference to table TB, and rewrites the table in accordance with the operation states of the own station and the opposite station.

If a failure occurs on one of the transponders 20 provided for respective wavelengths, the controller 40 of the A-station, or of the B-station, switches the optical switch unit 30, and its switching control will be explained with reference to FIGS. 2-14 as follows. The controller 40 switches the optical switch unit 30 so that the client device 50 having been connected to the transponder 20 in failure is connected to the transponder 20 having been connected to the client device 50 of a priority order lower than that of the client device 50 having been connected to the transponder 20 in failure. In each of the drawings, the optical transmission device including the transponders 20A-F illustrated on the A-station on the left side and the optical transmission device including the transponders 20a-f illustrated on the B-station on the right side are one-to-one connected through the transmission line OTL, e.g., as illustrated in FIG. 1A.

Figure 2:
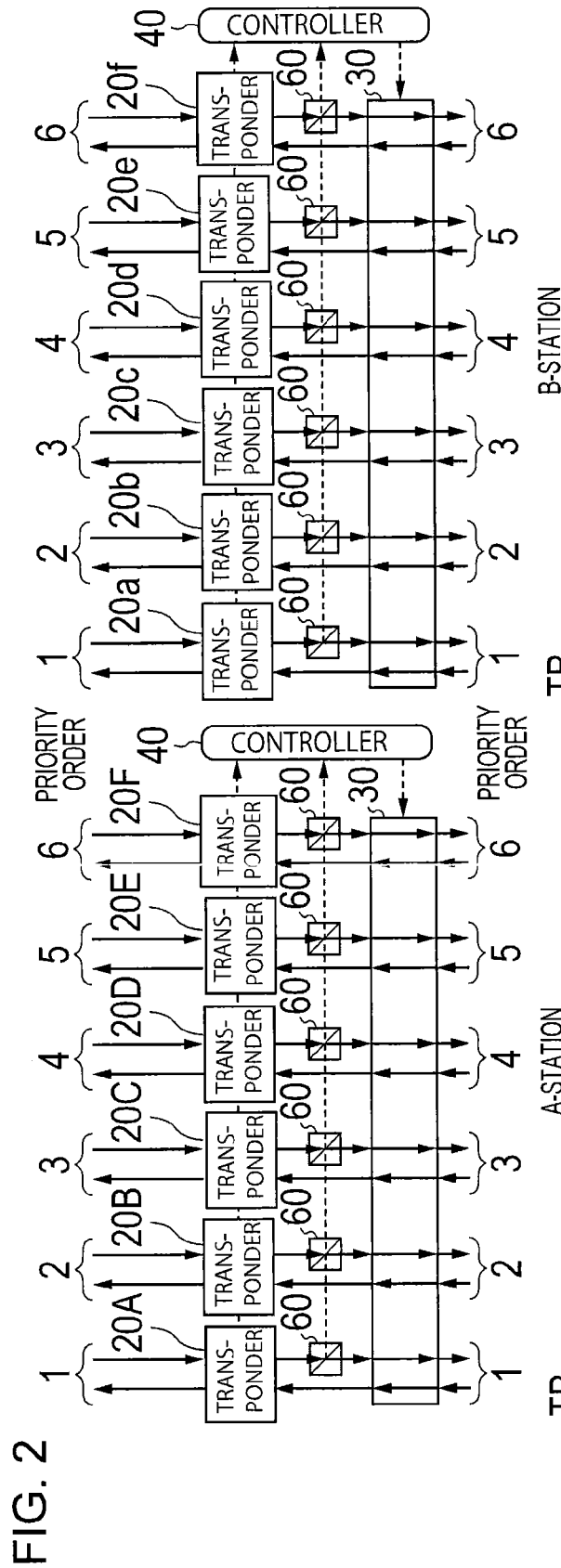
FIG. 2 illustrates a state in which all the transponders of both the A-station and B-station are in normal operation.

FIG. 2 illustrates a state in which all the transponders 20 of both the A- and B-stations are in normal operation. Items of the table TB in that state will be explained.

It is assumed that priority orders "1" and "6" are the highest and lowest priority orders, respectively. The above priority order indicates a priority order of an optical signal dealt with by each of the transponders 20, and is ranked in accordance with a kind of data sent and received by the client device 50, quality of service relating to, e.g., voice or data communication, and importance of data. The transponder 20 related to each of the client devices 50 is assigned a priority order of the associated client device 50 in an initial state so that the priority order of each of the transponders 20 is written in the table TB.

The transmission label (Label) is an identification label carried by an optical signal transmitted by the transponder 20 of the own station to the opposite station. The receiving label (Label) is a transmission label of the transponder 20 of the opposite station, and is an identification label actually included in an optical signal provided from the wavelength division multiplex unit 10 to the transponder 20. The receiving label (Label) expected value is an identification label of an optical signal ought to be received by the transponder 20 of the own station, and is set in advance.

The switch (Switch) state is switching data of the optical switch unit 30, and has values of "priority order indicator", "return" and "OFF". The value "priority order indicator" indicates that the transponder 20 is connected to the client device 50 of which priority order. The value "return" indicates that an output of the transponder 20 on a side of the client device 50 turns back and returns to the wavelength division multiplex unit 10. The value "OFF" indicates that the transponder 20 is not connected to any one of the client devices 50. That is, the value "OFF" indicates that an optical signal is not provided from the wavelength division multiplex unit 10 to any one of the client devices 50 and an optical signal is not provided from any one of the client devices 50 to the wavelength division multiplex unit 10 through the transponder 20.

The state (unit state) is data indicating a present state of the transponder 20, and has values of "normal", "own station failure", "opposite station failure" and "waiting". The value "normal" indicates that an optical signal of a corresponding wavelength gets through. The value "own station failure" indicates a state in which an occurrence of a failure concerning the transponder 20 of the own station is recognized. The value "opposite station failure" indicates a state in which irregularity is detected on a corresponding optical signal input from the wavelength division multiplex unit 10 while the transponder 20 of the own station is normal. The value "waiting" indicates that the transponder 20 is a backup transponder 20 that is not working in a case where the number of the transponders 20 is greater than the number of the client devices 50.

The operation state indicates not a state of every transponder 20 but a present state of the station, and has values of "normal operation", "own station failure switching" and "opposite station failure switching". The value "normal operation" indicates a state in which both of the stations are in normal operation. The value "own station failure switching" indicates that a failure occurs on the own station and the station is in switching control operation. The value "opposite station failure switching" indicates that a failure occurs on the opposite station and the station is in switching control operation.

The present lowest priority order indicates a priority order value of one of the transponders 20 in normal operation at present for which the priority order of the corresponding client device 50 is the lowest.

In the table TB of the A-station illustrated in FIG. 2, e.g., as no failure occurs on any one of the transponders 20 and no failure occurs on the optical signal input from the B-station, an item of the operation state is "normal operation" indicating that both the own station and the opposite station are in normal operation. Then, as all the transponders 20 are in normal operation, an item of the present lowest priority order indicating the lowest priority value of the corresponding client devices 50 is "6".

Further, follow items of the individual transponders 20A-F. First, as the transponder 20A is connected to the client device 50 of the priority order "1" as an initial setting, both items of the priority order and the switch state are "1". "AAA" is set as the transmission label of the transponder 20A. Then, as the transponder 20A is set being provided with an optical signal by the transponder 20a of the B-station, the transmission label of the transponder 20a of the B-station "aaa" is set for an item of the receiving label expected value. As they are in normal operation, an item of the receiving label is "aaa" as expected and an item of the state is "normal".

Items of the other transponders 20B-F are similarly set. As the transponder 20B is connected to the client device 50 of the priority order of "2", both items of the priority order and the switch state are "2". "BBB" is set to the transmission label of the transponder 20B, and as the transponder 20B is set being provided with an optical signal by the transponder 20b of the B-station, the transmission label of the transponder 20b of the B-station "bbb" is set for an item of the receiving label expected value. As they are in normal operation, an item of the receiving label is "bbb" as expected and an item of the state is "normal".

As the transponder 20C is connected to the client device 50 of the priority order of "3", both items of the priority order and the switch state are "3". "BBB" is set to the transmission label of the transponder 20C, and as the transponder 20C is set being provided with an optical signal by the transponder 20c of the B-station, the transmission label of the transponder 20C of the B-station "ccc" is set for an item of the receiving label expected value. As they are in normal operation, an item of the receiving label is "ccc" as expected and an item of the state is "normal".

As the transponder 20D is connected to the client device 50 of the priority order of "4", both items of the priority order and the switch state are "4". "DDD" is set to the transmission label of the transponder 20D, and as the transponder 20D is set being provided with an optical signal by the transponder 20d of the B-station, the transmission label of the transponder 20D of the B-station "ddd" is set for an item of the receiving label expected value. As they are in normal operation, an item of the receiving label is "ddd" as expected and an item of the state is "normal".

As the transponder 20E is connected to the client device 50 of the priority order of "5", both items of the priority order and the switch state are "5". "EEE" is set to the transmission label of the transponder 20E, and as the transponder 20E is set being provided with an optical signal by the transponder 20e of the B-station, the transmission label of the transponder 20E of the B-station "eee" is set for an item of the receiving label expected value. As they are in normal operation, an item of the receiving label is "eee" as expected and an item of the state is "normal".

As the transponder 20F is connected to the client device 50 of the lowest priority order in the initial setting of "6", both items of the priority order and the switch state are "6". "FFF" is set to the transmission label of the transponder 20F, and as the transponder 20F is set being provided with an optical signal by the transponder 20f of the B-station, the transmission label of the transponder 20F of the B-station "fff" is set for an item of the receiving label expected value. As they are in normal operation, an item of the receiving label is "fff" as expected and an item of the state is "normal".

Incidentally, for the B-station, i.e., an opposite station of the A-station, the table TB is initially set similarly as for the A-station as illustrated in FIG. 2.

Figure 3:
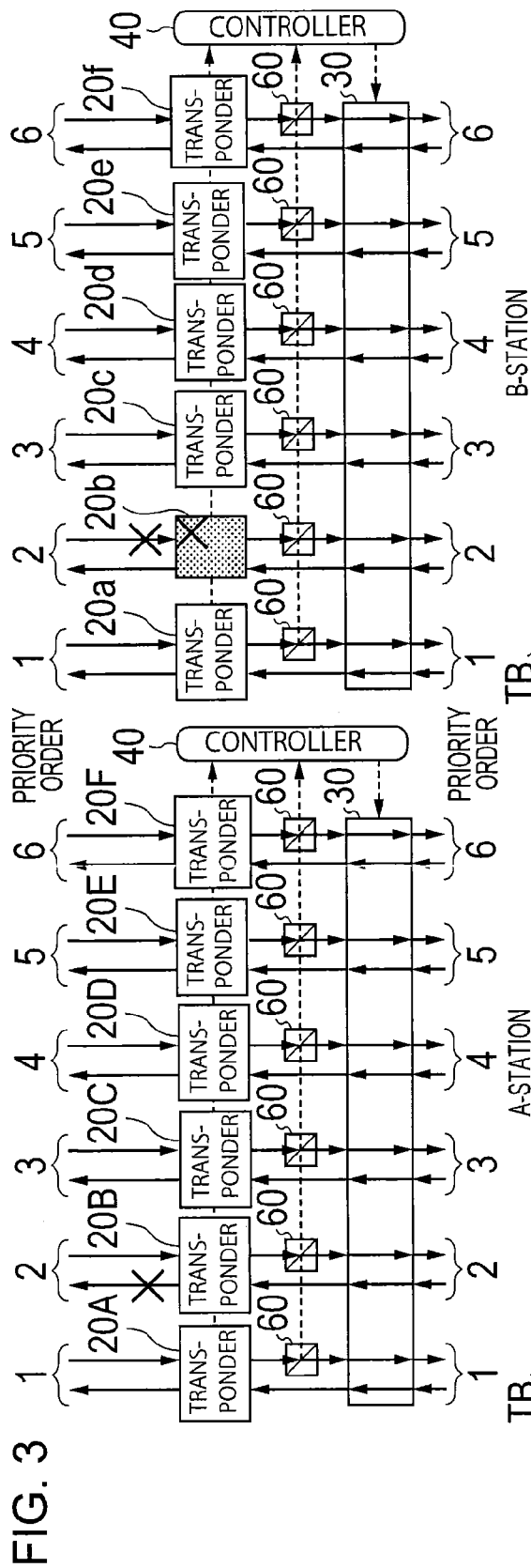
FIG. 3 illustrates a state of the optical transmission device in failure.

FIG. 3 illustrates a state of the optical transmission device in failure. Assume that a failure illustrated in FIG. 3 occurs in the above state where the A- and B-stations are in normal operation in accordance with the initial settings. A situation illustrated in FIG. 3 is a situation of a failure occurrence on an output of the transponder 20B in charge of the priority order "2" on the side of the transmission line (on the side of the wavelength division multiplex unit 10). At this moment, though, the controller 40 of the A-station optical transmission device is not aware of the failure occurrence on the own station. Concerning the optical transmission device of the B-station, meanwhile, as irregularity occurs on a transmission line side input of the transponder 20b supposed to receive the optical signal of the A-station transponder 20B, i.e., on a corresponding optical signal input from the wavelength division multiplex unit 10, the B-station controller 40 recognizes the failure occurrence. In a case illustrated in FIG. 3, as the B-station transponder 20b is not in failure, the B-station controller 40 recognizes an opposite station failure, and rewrites the state of the transponder 20b (transponder of irregular transmission line side input) to "opposite station failure".

Then, the B-station controller 40 checks whether or not there is a transponder 20 corresponding to a lower priority order than the client device 50 connected to the transponder 20b of the irregular transmission line side input. That is, the B-station controller 40 searches the table TB for a transponder 20, in the own station, connected to a client device 50 ranked in lower priority order than the client device 50 connected to the transponder 20b of the irregular transmission line side input. Then, if the own station includes such a transponder 20, the B-station controller 40 changes the operation state of the table TB to "opposite station failure switching", and shifts to an opposite station failure switching sequence.

Figure 4:
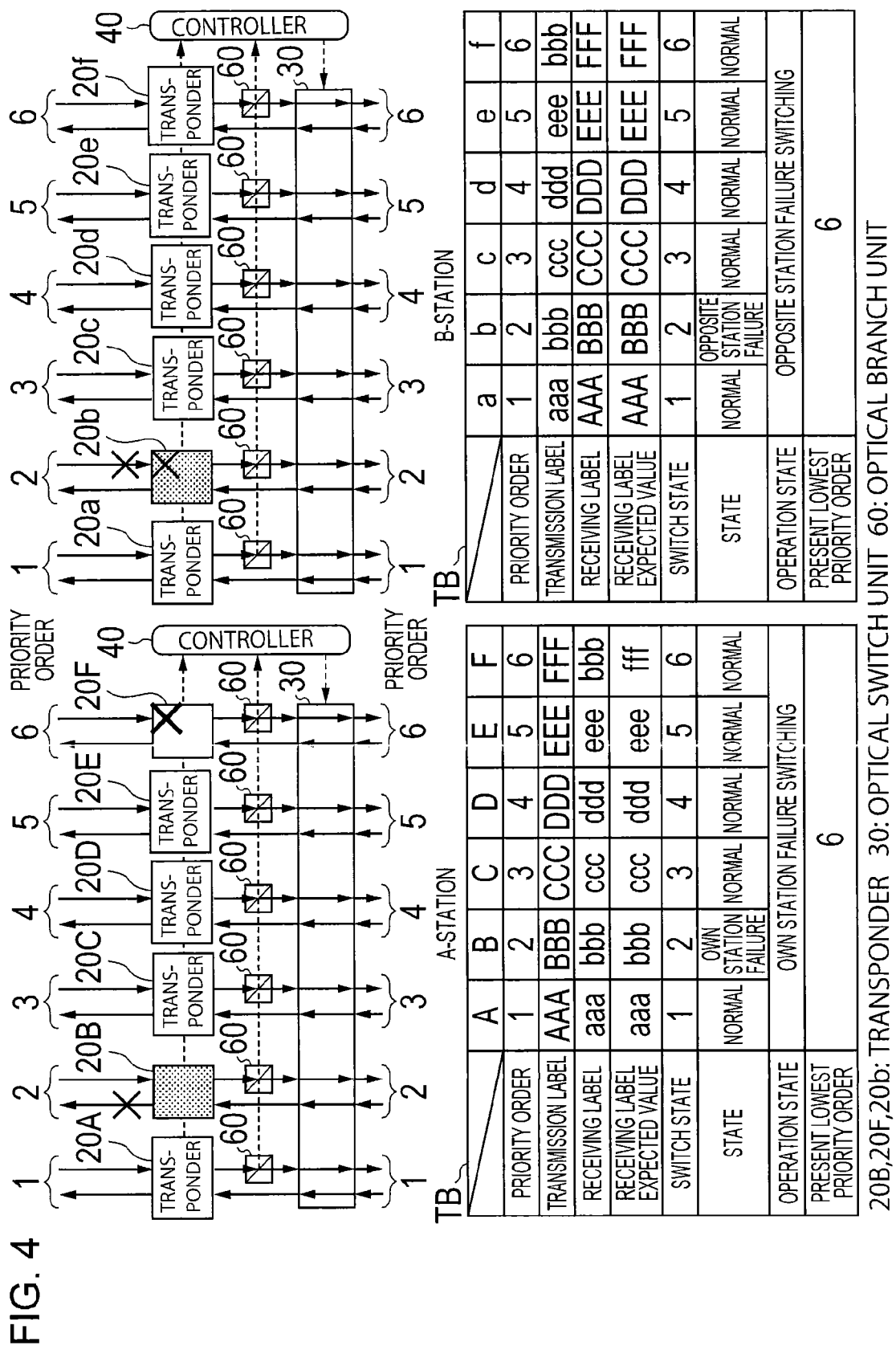
FIG. 4 illustrates a state of the optical transmission device following FIG. 3.

FIG. 4 illustrates a state of the optical transmission device following FIG. 3. In a case where there is a plurality of the client device 50 of lower priority order than the client device 50 connected to the transponder 20b, the B-station controller 40 having shifted to the opposite station failure switching sequence in FIG. 4 rewrites the transmission label "fff" of the table TB, e.g., of the transponder 20f connected to the client device 50 of the present lowest priority order "6", to the transmission label "bbb" of the transponder 20b of the irregular transmission line side input. Thus, an optical signal having the transmission label "bbb" corresponding to the priority order "2" rendered irregular is provided from the B-station transponder 20b, wavelength division multiplexed with a WDM signal by the wavelength division multiplex unit 10 and transmitted to the transmission line OTL.

On the A-station optical transmission device, then, the transponder 20F corresponding to the lowest priority order "6" is provided with the optical signal including the receiving label "bbb" corresponding to the priority order "2" from the wavelength division multiplex unit 10. Hence, the A-station controller 40 rewrites the receiving label of the transponder 20F to "bbb" in the table TB. As a result, as the receiving label "bbb" of the transponder 20F differs from the receiving label expected value "fff" of the transponder 20F in the table TB, the A-station controller 40 detects a label disagreement, i.e., a trace identifier disagreement. The A-station controller 40 can thereby identify a failure occurrence on the transponder 20B of the priority order "2" supposed to have the receiving label expected value "bbb", and rewrites the state of the transponder 20B to "own station failure" in the table TB. Then, changing the operation state of the table TB to "own station failure switching", the A-station controller 40 shifts to an own station failure switching sequence.

Figure 5:
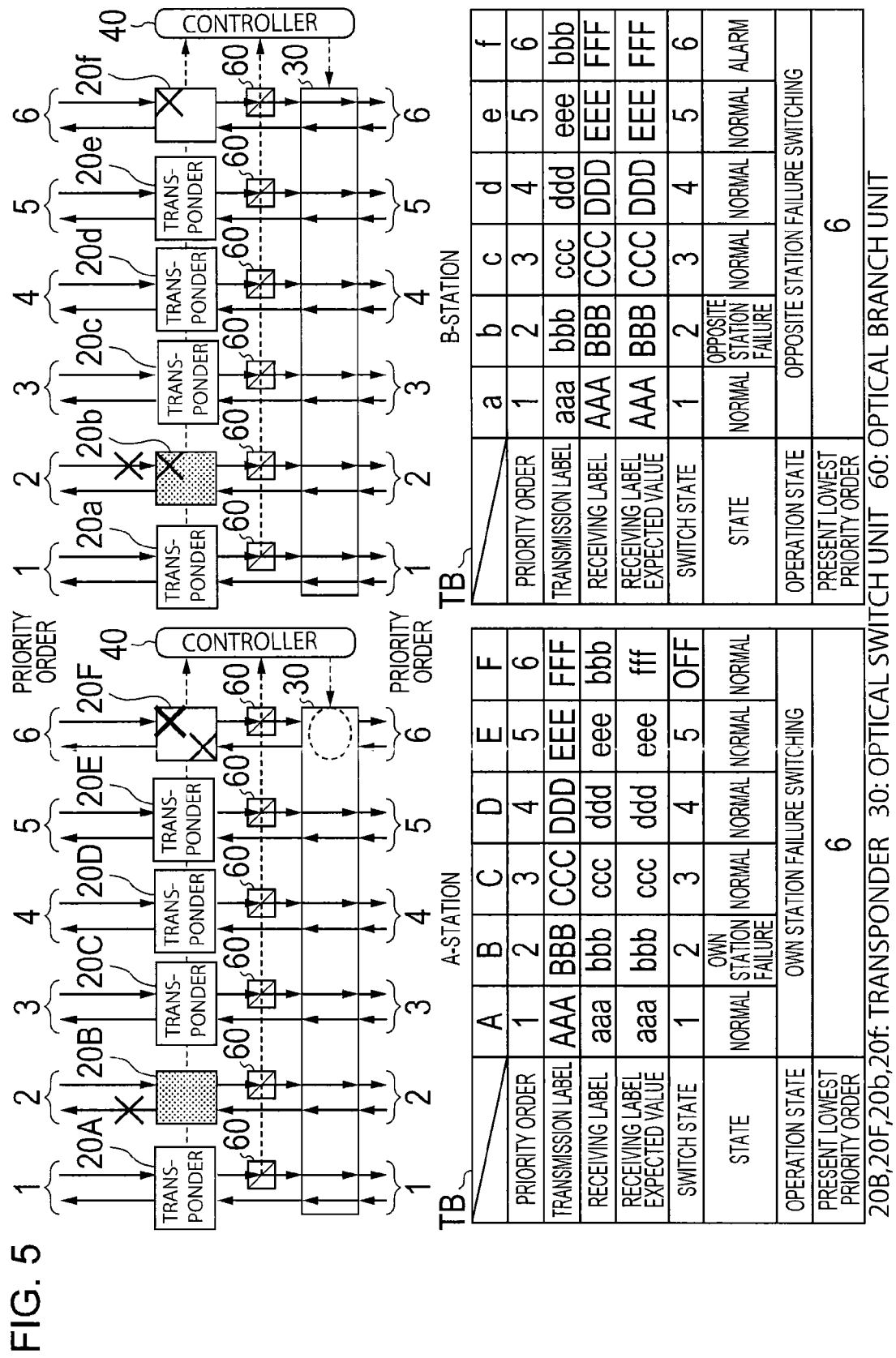
FIG. 5 illustrates a state of the optical transmission device following FIG. 4.

FIG. 5 illustrates a state of the optical transmission device following FIG. 4. The A-station controller 40 having shifted to the sequence of the own station failure switching in FIG. 5 controls the optical switch unit 30, turns off the connection between the client device 50 of the priority order "6" and the corresponding transponder 20F, and rewrites the switch state of the transponder 20F to "OFF" in the table TB. Thus, as the output of the A-station transponder 20F on the transmission line side is rendered irregular, irregularity occurs on an input of the B-station transponder 20f to which the receiving label expected value corresponding to this transponder 20F is being set to "FFF" on the transmission line side. Recognizing the irregular transmission line side input of the transponder 20f, the B-station controller 40 rewrites the state of the transponder 20f to "alarm" in the table TB. Thus, the B-station controller 40 identifies the A-station side as having recognized its own station failure.

Owing to the above communication between the A-station and the B-station, the A-station controller 40 can recognize the failure occurrence on the output of its own transponder 20B on the transmission line side, and the B-station controller 40 can identify the failure occurrence relating to the transponder 20B of the opposite station and identify the controller 40 of the opposite station as having recognized the failure occurrence. That is, the controllers 40 of both of the stations can cooperate with each other so as to control substitution of the transponder 20B in failure.

Figure 6:
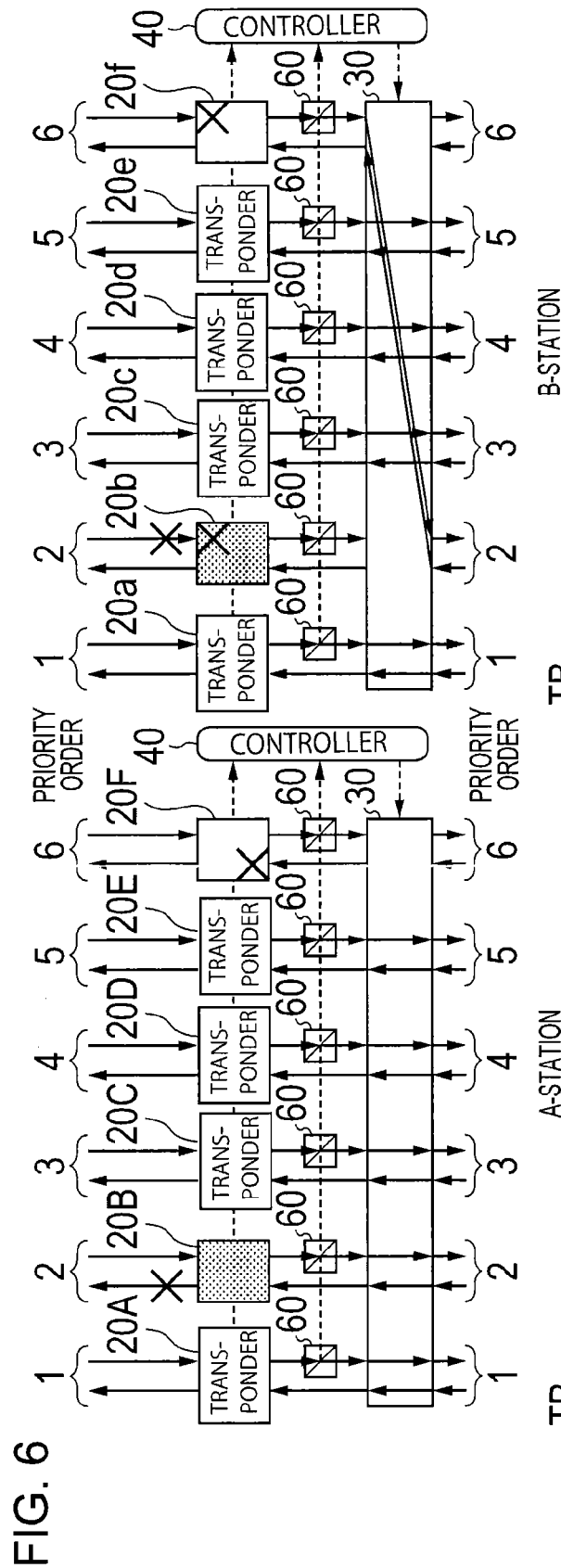
FIG. 6 illustrates a state of the optical transmission device following FIG. 5.

FIG. 6 illustrates a state of the optical transmission device following FIG. 5. After the irregular transmission line side input of the transponder 20f corresponding to the priority order "6" is detected in FIG. 6, the B-station controller 40 restores in the table TB the transmission label having been rewritten to "bbb" to the original identification label "fff" before being rewritten. Further, the B-station controller 40 controls the optical switch unit 30 and switches the transponder 20f having been rewritten to the transmission label "fff" to be connected with the client device 50 of the priority order "2" having been connected to the transponder 20b in the opposite station failure state. Having switched the optical switch unit 30 as described above, the B-station controller 40 rewrites the switch states of the transponder 20b and the transponder 20f to "OFF" and "priority order 2", respectively.

As a receiving label of an optical signal provided from the wavelength division multiplex unit 10 to the transponder 20F becomes "fff" at the A-station owing to the above substitution control of the B-station controller 40, the A-station controller 40 rewrites the receiving label of the transponder 20F to "fff" in the table TB. As a result, the receiving label and the receiving label expected value of the A-station transponder 20F agrees with each other.

Figure 7:
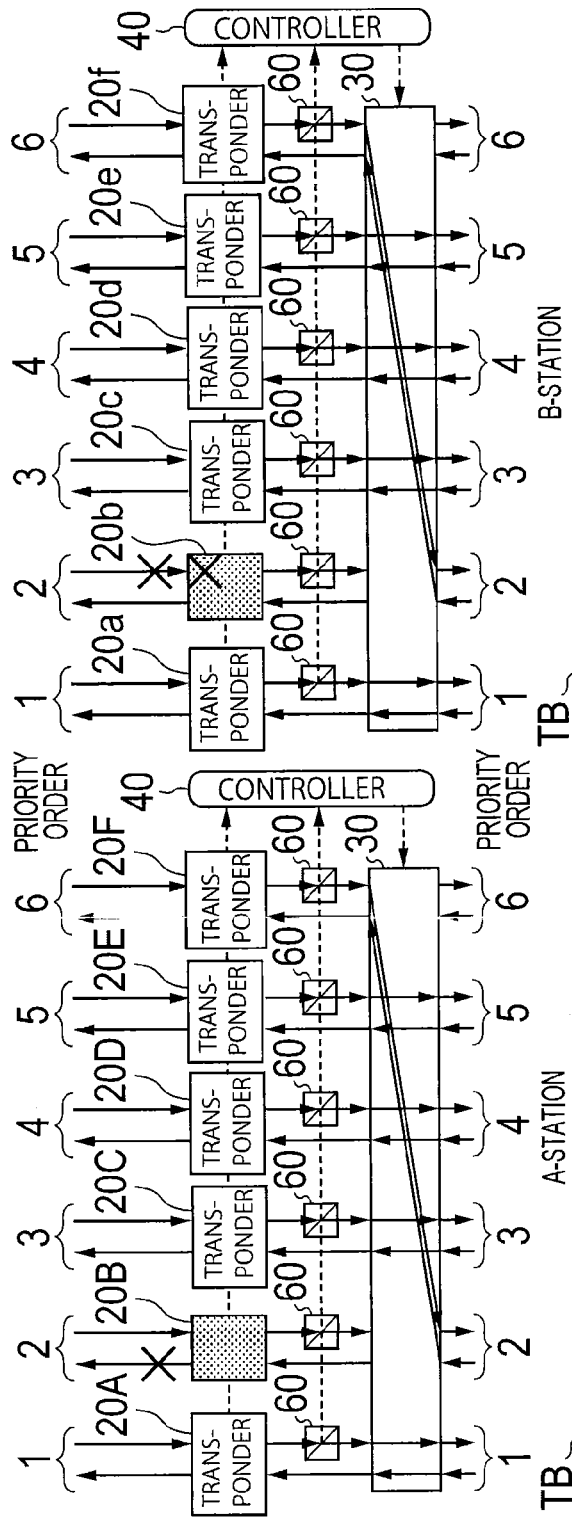
FIG. 7 illustrates a state of the optical transmission device following FIG. 6.

FIG. 7 illustrates a state of the optical transmission device following FIG. 6. After the receiving label of the transponder 20F returns to the original value in FIG. 7, the A-station controller 40 recognizes that the optical switch unit 30 is switched at the B-station, and controls the A-station optical switch unit 30. At this moment, the A-station controller 40 switches the optical switch unit 30 so that the transponder 20F having been connected the client device 50 of the priority order "6" is connected to the client device 50 of the priority order "2". That is, the A-station controller 40 switches the optical switch unit 30 so that the transponder 20F for which the receiving label and the receiving label expected value consistently return to "fff" and the client device 50 having been connected to the transponder 20B to which the receiving label "bbb" which differs from the receiving label expected value before the agreement is originally set are connected with each other.

Having switched the optical switch unit 30 as described above, the A-station controller 40 rewrites the switch state of the transponder 20B to "OFF", and rewrites the switch state of the transponder 20F to "priority order 2" in the table TB. Thus, an optical signal of the priority order "2" is normally transmitted and received between the A-station transponder 20F having been provided with the lowest priority order "6" and the B-station transponder 20f.

Figure 8:
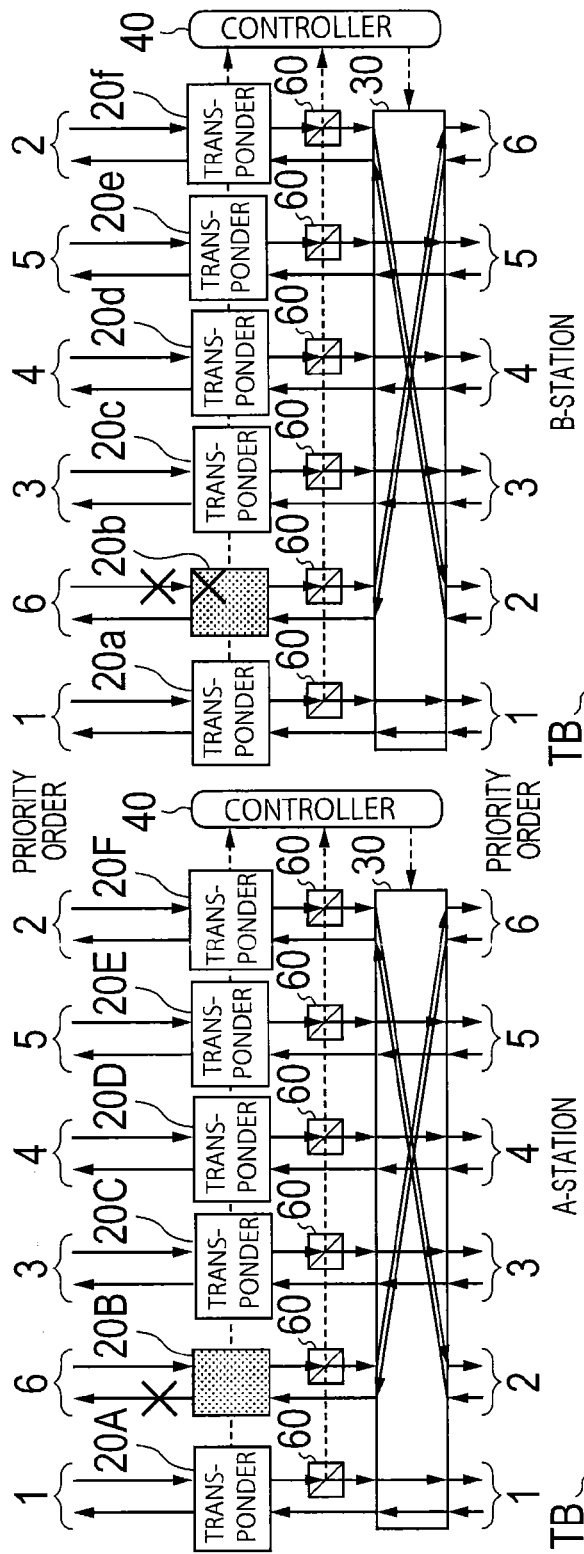
FIG. 8 illustrates a state of the optical transmission device following FIG. 7.

FIG. 8 illustrates a state of the optical transmission device following FIG. 7. If it is checked in FIG. 8 that the transponder 20F and the transponder 20f normally communicate with each other, the controllers 40 of the A- and B-stations switch the optical switch units 30 so that the client devices 50 of the priority order "6" are connected to the transponders 20B and 20b having corresponded to the priority order "2", respectively. Then, the controllers 40 of the A- and B-stations rewrite the priority order of the transponders 20B and 20b to "6", rewrite the priority order of the transponders 20F and 20f to "2" in the respective tables TB, respectively, and rewrites the switch states of the transponders 20B and 20b to "priority order 6". Further, each of the controllers 40 rewrites the operation state of each of the tables TB to "normal operation", rewrites the present lowest priority order to "5" and ends the sequence.

Owing to the above process, the transponder 20 of the priority order "6" is used so that the optical signal of the priority order "2" can be substituted and saved. Then, the transponder 20 in failure can be recovered after the substitute-and-save process. If the transponder 20 is recovered, the optical signal of the priority order "6" can return to the transponder 20. That is, a transponder in failure can be substituted and saved by another transponder of lower priority order than the transponder in failure without a backup redundant transponder. Moreover, the own and other stations exchange an optical signal with each other so that both the stations can cooperate with each other so as to automatically perform the saving process.

After the substitute-and-save process for the transponders 20B and 20b of the priority order "2" by means of the transponders 20F and 20f of the priority order "6", a similar failure may occur on the A-station transponder 20A. A process for dealing with such a failure is illustrated in FIGS. 9-14. That is, even failures occurring on a plurality of the transponders can be dealt with by a similar substitute-and-save process.

Figure 9:
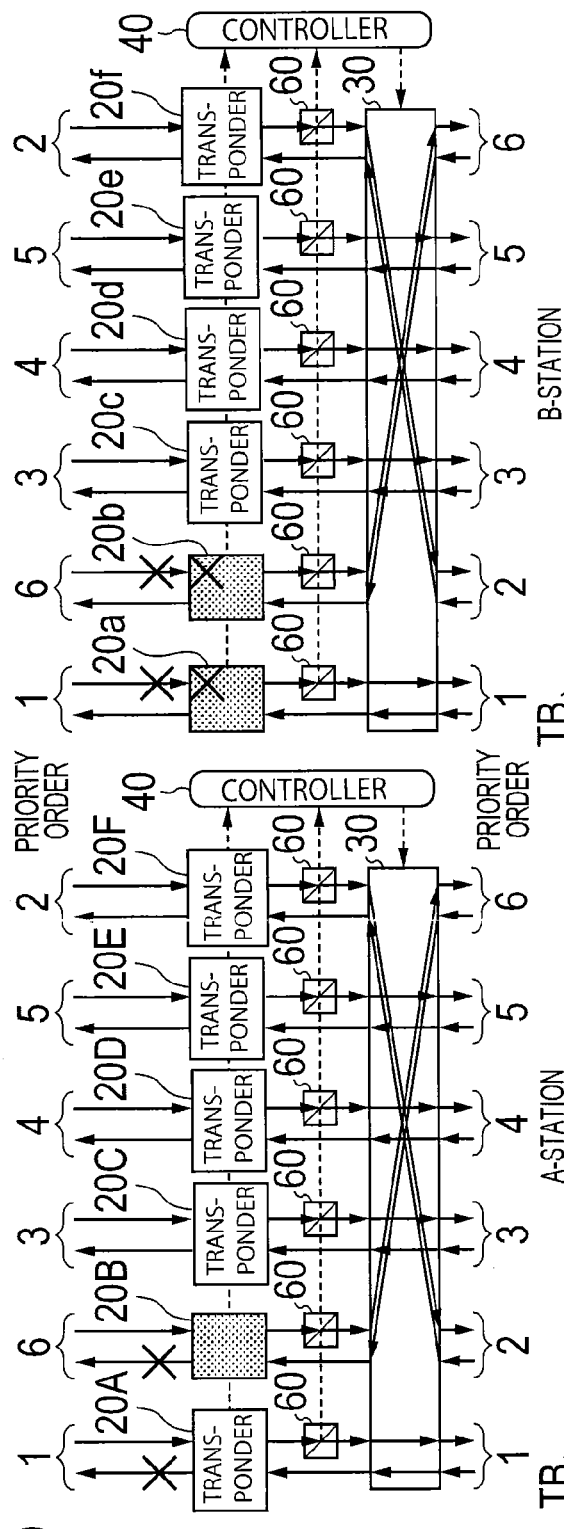
FIG. 9 illustrates a state of the optical transmission device following FIG. 8.

FIG. 9 illustrates a state of the optical transmission device following FIG. 8. In FIG. 9, although the A-station transponder 20A is in failure on a transmission line side output, the A-station controller 40 is not aware of the failure of the own station yet. Meanwhile, the B-station transponder 20a supposed to receive an optical signal of the A-station transponder 20A causes irregular transmission line side input, as irregularity occurs on a corresponding optical signal input from the wavelength division multiplex unit 10. As the B-station transponder 20a itself is not in failure at this moment, the B-station controller 40 recognizes an occurrence of an opposite station failure, and rewrites the state of the transponder 20a to "opposite station failure". Then, the B-station controller 40 searches the table TB for a transponder 20 connected to a client device 50 of a lower priority order than the client device 50 connected to the transponder 20a of the irregular transmission line side input. As a result, if there is one of a lower priority order, the B-station controller 40 sets the operation state of the table TB to "opposite station failure switching", and shifts to a sequence of the opposite station failure switching.

Figure 10:
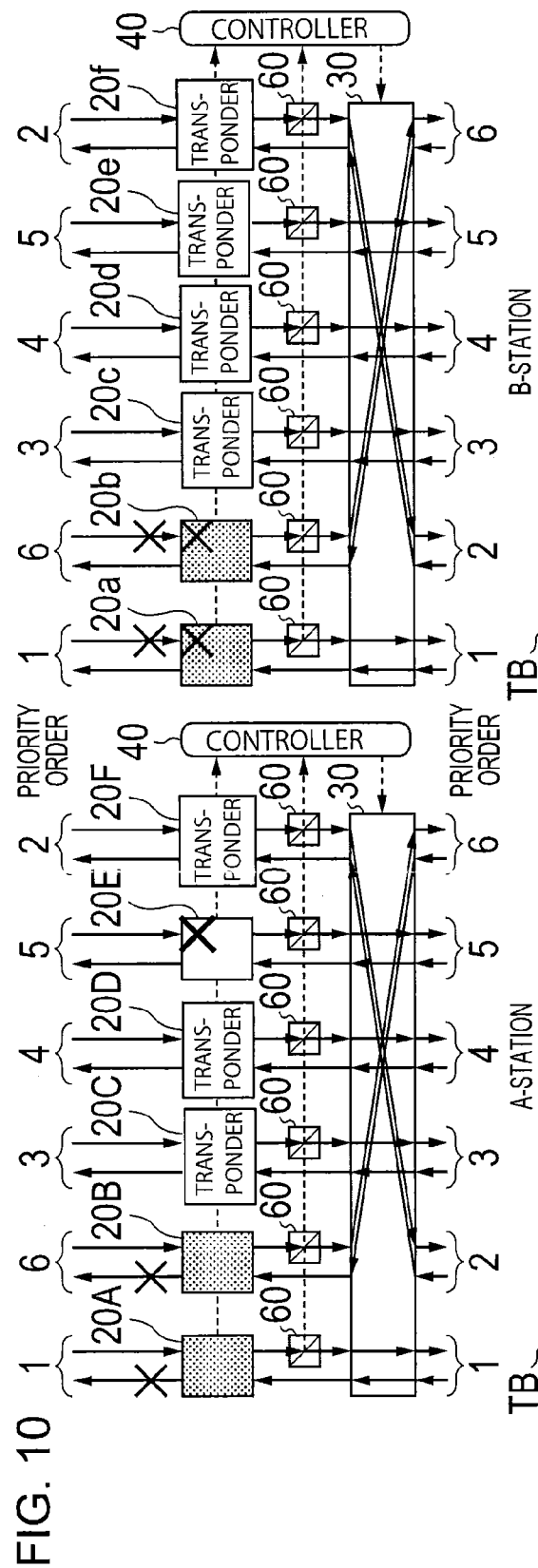
FIG. 10 illustrates a state of the optical transmission device following FIG. 9.

FIG. 10 illustrates a state of the optical transmission device following FIG. 9. The B-station controller 40 having shifted to the sequence of the opposite station failure switching in FIG. 10 rewrites a transmission label "eee" of the table TB to a transmission label "aaa" of the transponder 20a of the irregular transmission line side input for the transponder 20e connected, e.g., to the client device 50 of the present lowest priority order "5" included in the client devices 50 of lower priority orders than the client device 50 connected to the transponder 20a. The B-station transponder 20a thereby outputs an optical signal having the transmission label "aaa" corresponding to the priority order "1", and the optical signal is wavelength-multiplexed with a WDM signal by the wavelength division multiplex unit 10 and is transmitted to the transmission line OTL.

At the A-station facing the above, the transponder 20E corresponding to the lowest priority order "5" is provided with the optical signal including the receiving label "aaa" corresponding to the priority order "1" from the wavelength division multiplex unit 10. Thus, the A-station controller 40 rewrites in the table TB the receiving label of the transponder 20A to "aaa". As the receiving label "aaa" of the optical signal provided to the transponder 20E consequently differs from the receiving label expected value "eee" of the transponder 20E in the table TB of the A-station, the A-station controller 40 detects a label disagreement. The A-station controller 40 thereby identifies a failure occurrence on the transponder 20A corresponding to the priority order "1" supposed to have the receiving label expected value "aaa", and rewrites the state of the transponder 20A to "own station failure" in the table TB. Then, the A-station controller 40 sets the operation state of the table TB to "own station failure switching", and shifts to a sequence of the own station failure switching.

Figure 11:
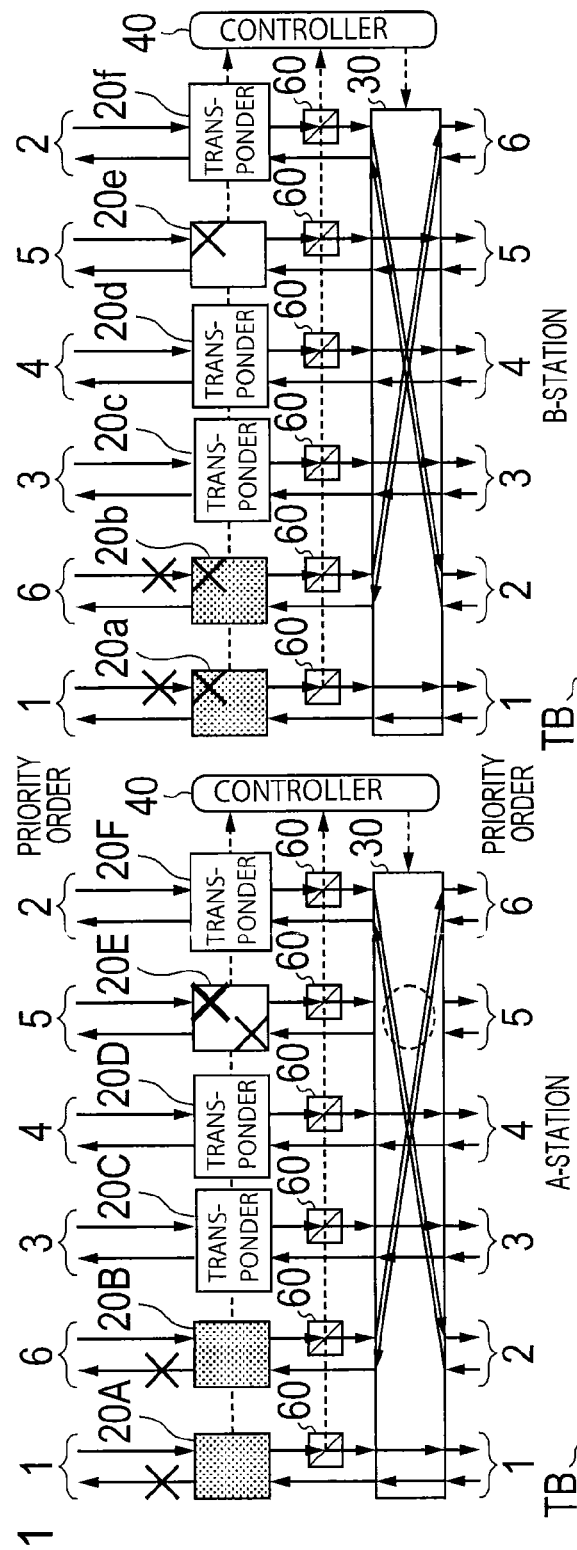
FIG. 11 illustrates a state of the optical transmission device following FIG. 10.

FIG. 11 illustrates a state of the optical transmission device following FIG. 10. The A-station controller 40 having shifted to the sequence of the own station failure switching in FIG. 11 controls the optical switch unit 30, turns the connection between the client device 50 of the priority order "5" and the transponder 20E off, and rewrites the switch state of the transponder 20E to "OFF" in the table TB. Thus, as the output of the A-station transponder 20E on the transmission line side is rendered irregular, irregularity occurs on a transmission line side input of the B-station transponder 20e to which the receiving label expected value "EEE" corresponding to this transponder 20F is being set. Upon detecting the irregular transmission line side input of the transponder 20e, the B-station controller 40 rewrites the state of the transponder 20e to "alarm" in the table TB. Thus, the B-station controller 40 can identify the A-station side as being aware of its own station failure.

Figure 12:
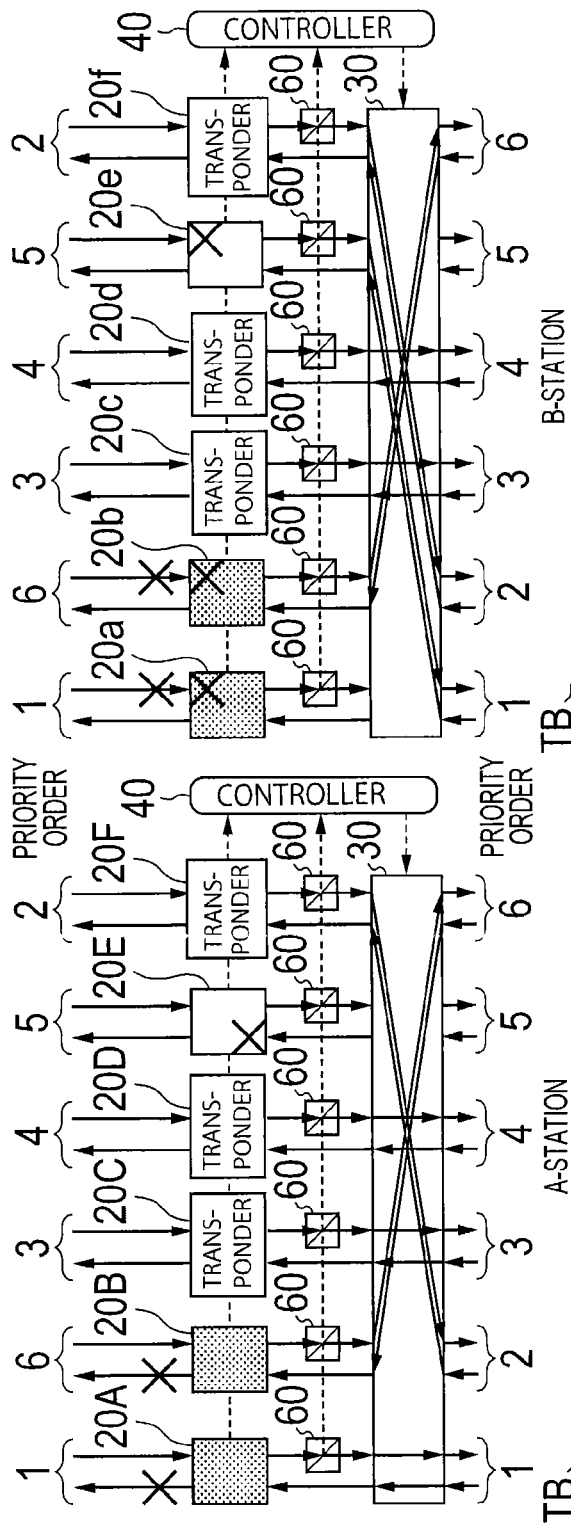
FIG. 12 illustrates a state of the optical transmission device following FIG. 11.

FIG. 12 illustrates a state of the optical transmission device following FIG. 11. After the irregular transmission line side input of the transponder 20e corresponding to the priority order "5" is detected in FIG. 12, the B-station controller 40 restores the transmission label of the transponder 20e having been rewritten to "aaa" to the original identification label "eee" before being rewritten in the table TB. Further, the B-station controller 40 switches the optical switch unit 30 so that the client device 50 of the priority order "1" having been connected to the transponder 20a in the opposite station failure state is connected to the transponder 20e for which the transmission label has been rewritten to "eee". Having switched the optical switch unit 30 as described above, the B-station controller 40 rewrites the switch states of the transponder 20a and the transponder 20e to "OFF" and "priority order 1", respectively.

On the A-station transponder 20E corresponding to the B-station transponder 20e, the receiving label thereby returns to "eee". Thus, the A-station controller 40 rewrites the receiving label of the transponder 20E to "eee" in the table TB. In the A-station table TB, then, as the receiving label of the transponder 20E agrees with the receiving label expected value, the A-station controller 40 recognizes that the optical switch unit 30 has been switched on the B-station.

Figure 13:
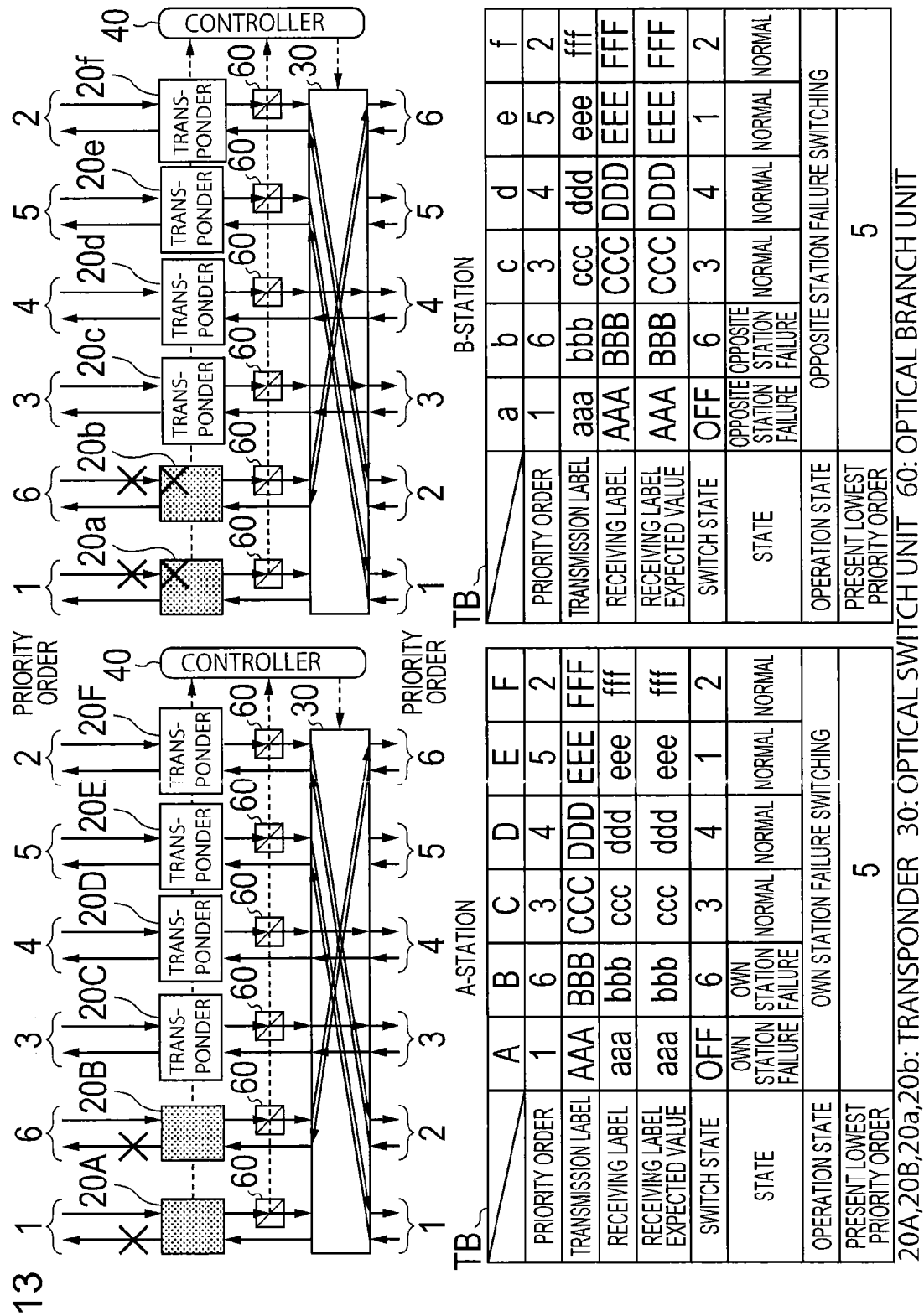
FIG. 13 illustrates a state of the optical transmission device following FIG. 12.

FIG. 13 illustrates a state of the optical transmission device following FIG. 12. After the receiving label of the transponder 20E returns to the original value in FIG. 13, the A-station controller 40 switches the optical switch unit 30 so as to connect the transponder 20E having been connected to the client device 50 of the priority order "5" and the client device 50 of the priority order "1". That is, the A-station controller 40 switches the optical switch unit 30 so that the transponder 20E for which the receiving label and the receiving label expected value consistently return to "eee" and the client device 50 having been connected to the transponder 20A to which the receiving label "aaa" which differs from the receiving label expected value before the agreement is originally set are connected with each other. Having switched the optical switch unit 30 as described above, the A-station controller 40 rewrites the switch state of the transponder 20A to "OFF", and rewrites the switch state of the transponder 20E to "priority order 1" in the table TB. Thus, an optical signal of the priority order "1" is normally transmitted and received between the transponder 20E having been in charge of the lowest priority order "5" and the transponder 20e.

Figure 14:
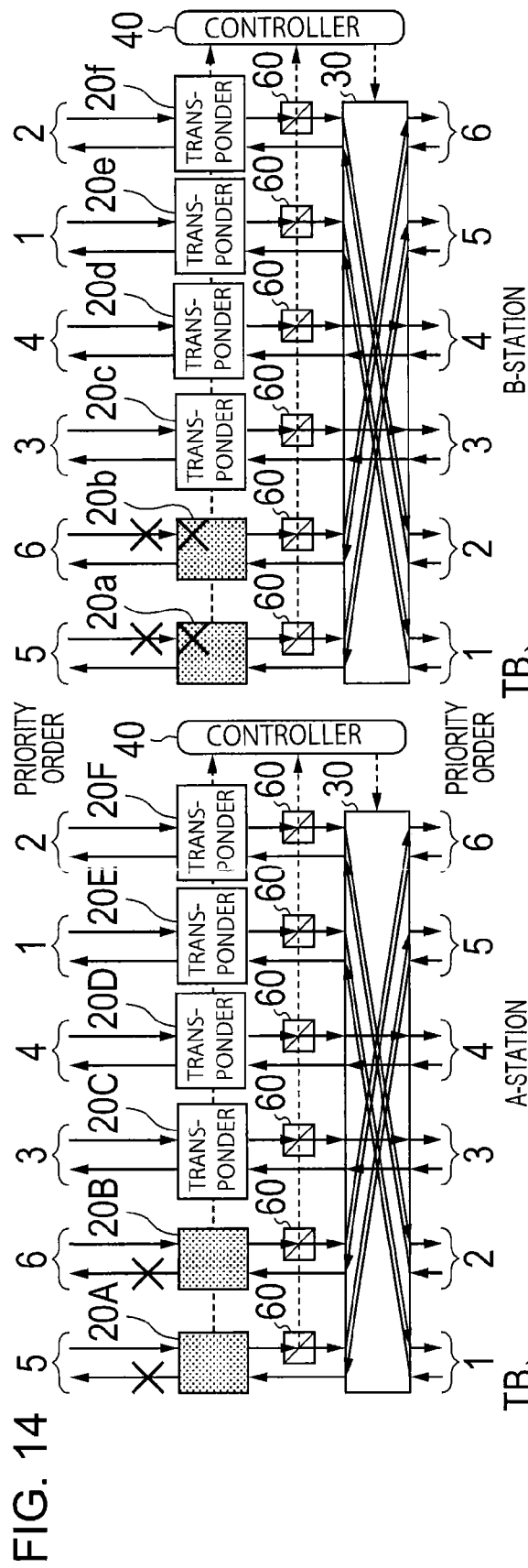
FIG. 14 illustrates a state of the optical transmission device following FIG. 13.

FIG. 14 illustrates a state of the optical transmission device following FIG. 13. If it is checked in FIG. 14 that the transponder 20E and the transponder 20e normally communicate with each other, the controllers 40 of the A- and B-stations switch the optical switch units 30 so that the client devices 50 of the priority order "5" are connected to the transponders 20A and 20a having corresponded to the priority order "1", respectively. Then, the controllers 40 of the A- and B-stations rewrite the priority order of the transponders 20A and 20a to "5", and rewrite the priority order of the transponders 20E and 20e to "1" in the individual tables TB, respectively, and rewrites the switch states of the transponders 20A and 20a to "priority order 5". Further, each of the controllers 40 rewrites the operation state of each of the tables TB to "normal operation", rewrites the present lowest priority order to "4" and ends the sequence.

Figure 15:
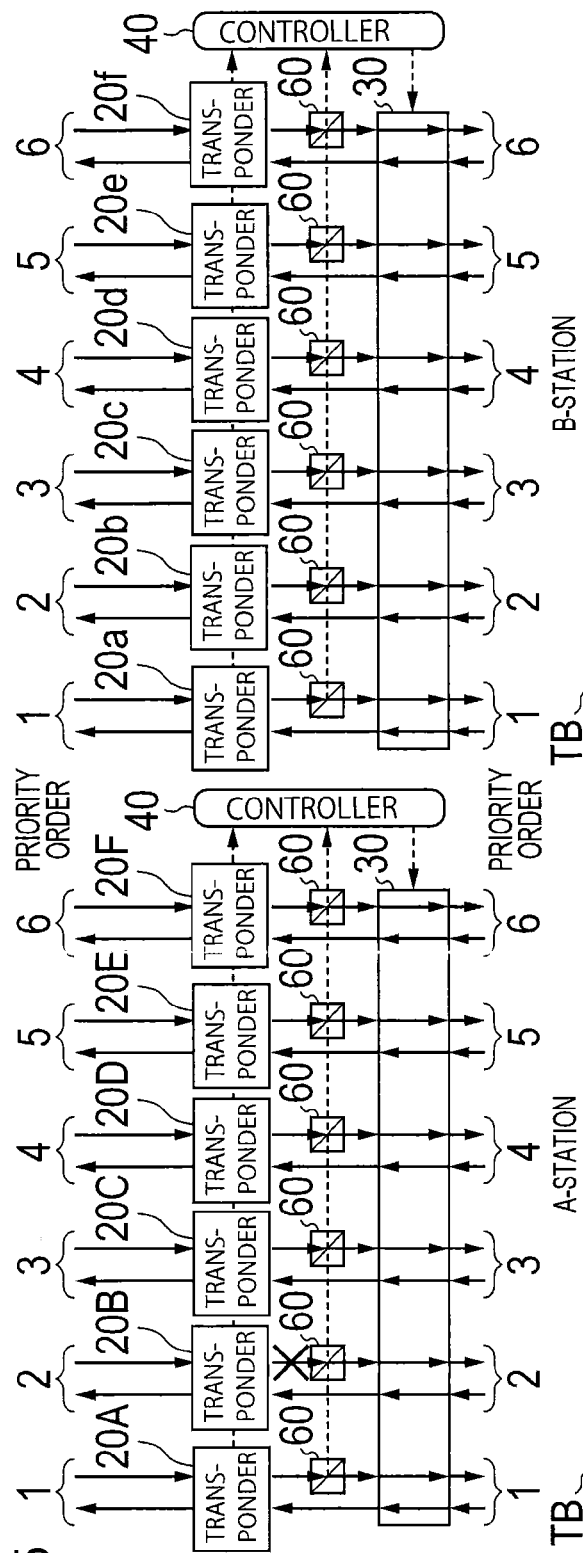
FIG. 15 illustrates another state of the optical transmission device in failure which is different from that illustrated in FIG. 3.
Figure 16:
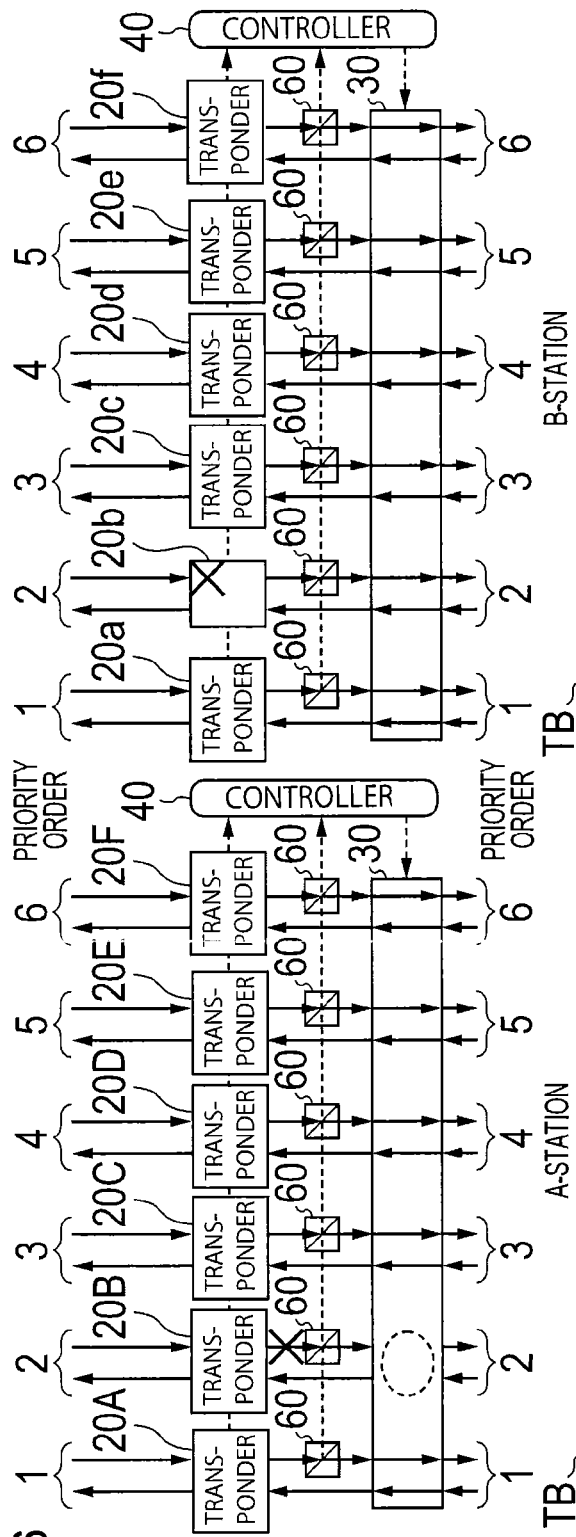
FIG. 16 illustrates a state of the optical transmission device following FIG. 15.
Figure 17:
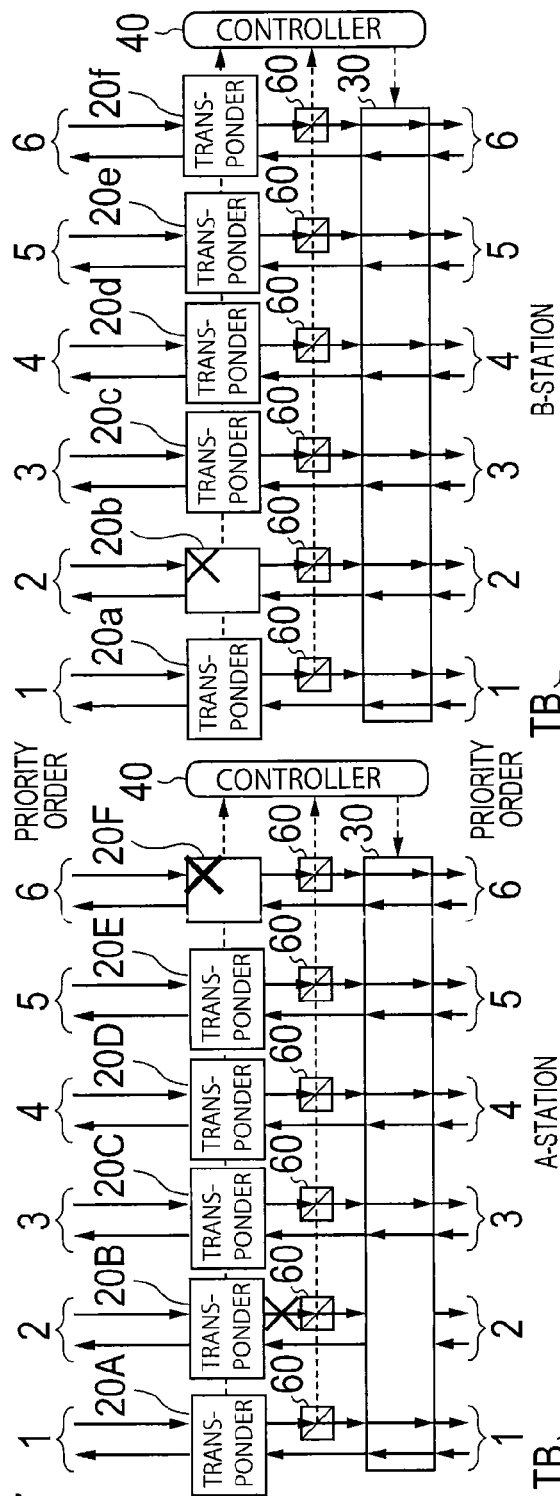
FIG. 17 illustrates a state of the optical transmission device following FIG. 16.

FIGS. 15-17 show a process for dealing with a case where the transponder 20 is in failure on the side of the client device 50 and the controller 40 detects the own station failure. The A-station optical transmission device having the transponders 20A-F illustrated on the left of the drawings and the B-station optical transmission device having the transponders 20a-f illustrated on the right of the drawings are one-to-one connected through the transmission line OTL, similarly as described above.

FIG. 15 illustrates another state of the optical transmission device in failure which is different from that illustrated in FIG. 3. In FIG. 15, the transponder 20B connected to the client device 50 of the priority order "2" of the A-station is in failure on the client device side output, and the A-station controller 40 detects the failure by watching through the optical branch unit 60. Upon recognizing the failure of the transponder 20B on the client device side, the A-station controller 40 rewrites the state of the transponder 20B to "own station failure" in the table TB, sets the operation state to "own station failure switching" and shifts to a sequence of the own station failure switching.

FIG. 16 illustrates a state of the optical transmission device following FIG. 15. The A-station controller 40 having shifted to the sequence of the own station failure switching in FIG. 16 controls the optical switch unit 30, turns the connection between the transponder 20B being in failure and the client device of the priority order "2" off, and rewrites the switch state of the transponder 20B to "OFF" in the table TB. On the B-station transponder 20b to which the receiving label expected value "BBB" corresponding to the transponder 20B is set, a corresponding optical signal input from the wavelength division multiplex unit 10 is thereby rendered irregular. Thus, the B-station controller 40 recognizes an occurrence of an opposite station failure concerning the transponder 20b on which irregular transmission line side input has occurred, and rewrites the state of the transponder 20b to "opposite station failure" in the table TB. Then, the B-station controller 40 searches the table TB for a transponder 20 connected to a client device 50 of a lower priority order than the client device 50 connected to the transponder 20b of irregular transmission line side input. As a result, if there is one of a lower priority order, the B-station controller 40 sets the operation state of the table TB to "opposite station failure switching" and shifts to a sequence of the opposite station failure switching.

FIG. 17 illustrates a state of the optical transmission device following FIG. 16. The B-station controller 40 having shifted to the opposite station failure switching sequence in FIG. 17 rewrites the transmission label "fff" of the table TB of the transponder 20f connected to one of the plural client devices 50 of a lower priority order than the priority order "2", e.g., the client device 50 of the present lowest priority order "6", to the transmission label "bbb" of the transponder 20b in the state of irregular transmission line side input. Thus, an optical signal having the transmission label "bbb" corresponding to the priority order "2" is provided from the B-station transponder 20f, wavelength division multiplexed with a WDM signal by the wavelength division multiplex unit 10 and transmitted to the transmission line OTL.

On the A-station optical transmission device, then, the transponder 20F corresponding to the lowest priority order "6" is provided with the optical signal including the receiving label "bbb" corresponding to the priority order "2". Hence, the A-station controller 40 rewrites the receiving label of the transponder 20F to "bbb" in the table TB. As a result, as the receiving label of the optical signal provided to the transponder 20F differs from the receiving label expected value "fff" in the table TB, the A-station controller 40 detects a label disagreement. The A-station controller 40 thereby identifies the B-station side as being aware of the opposite station failure.

After the controllers 40 of both of the stations recognize the failure occurrence as described above, a similar process as illustrated in and after FIG. 5 is performed so that the optical signal of the priority order "2" can be substituted, transmitted and received, and saved by the transponders 20F and 20f having been in charge of the priority order "6".

Figure 19:
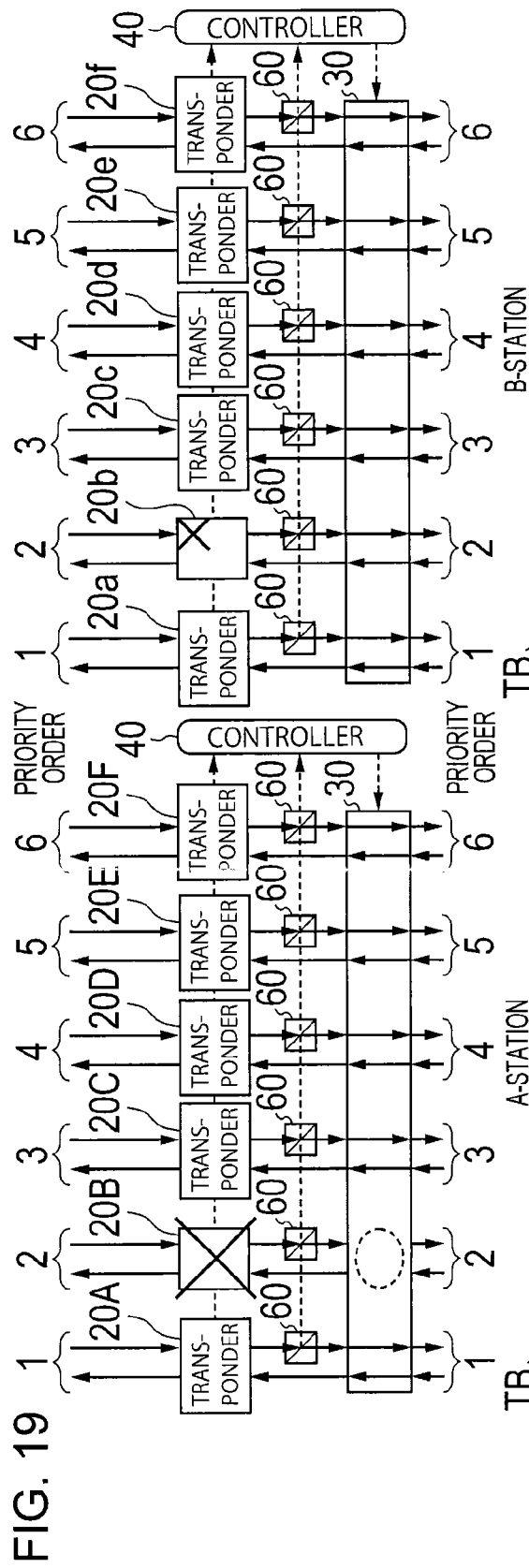
FIG. 19 illustrates a state of the optical transmission device following FIG. 18.
Figure 20:
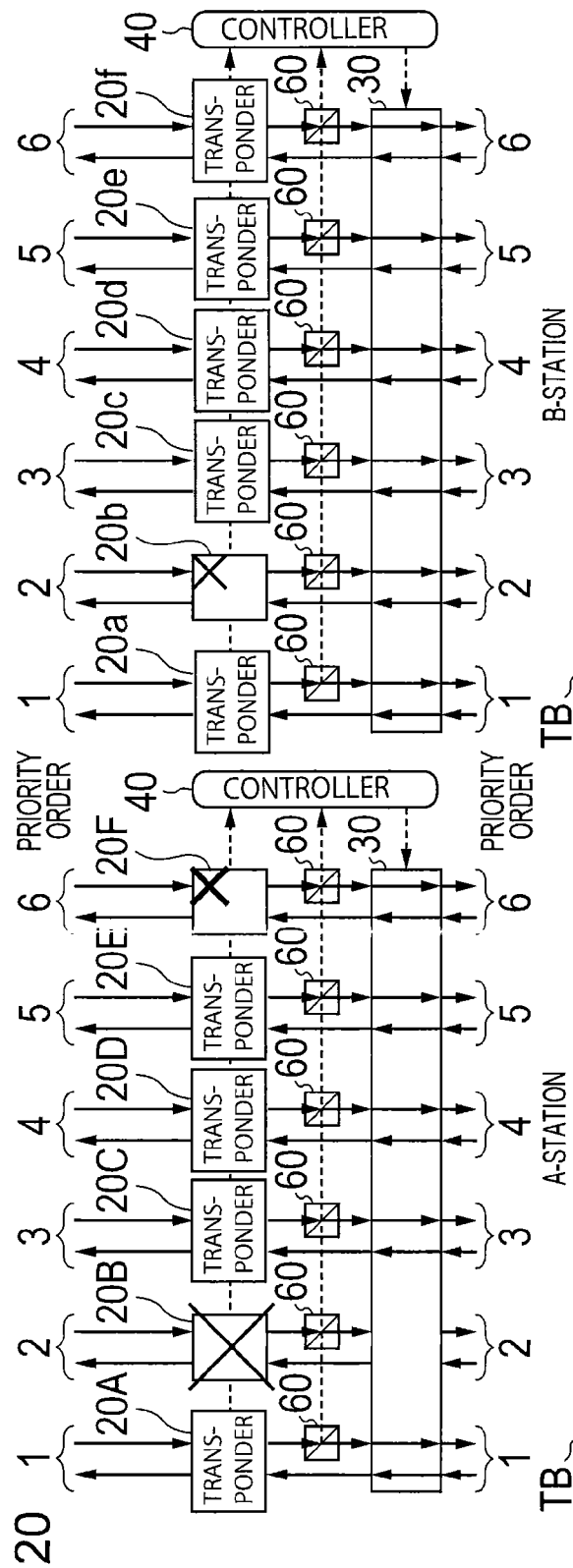
FIG. 20 illustrates a state of the optical transmission device following FIG. 19.

FIGS. 18-20 show a process for dealing with a case where the transponder 20 itself is in hardware failure. The A-station optical transmission device having the transponders 20A-F illustrated on the left of the drawings and the B-station optical transmission device having the transponders 20a-f illustrated on the right of the drawings are one-to-one connected through the transmission line OTL, similarly as described above.

FIG. 18 illustrates yet another state of the optical transmission device in failure which is different from those illustrated in FIG. 3 and FIG. 15. In FIG. 18, the transponder 20B connected to the client device 50 of the priority order "2" of the A-station is in hardware failure, and the transponder 20B is in failure on both of the transmission line side and the client device side. Upon detecting the transponder 20B itself being in failure, the A-station controller 40 rewrites the state of the transponder 20B to "own station failure" in the table TB, sets the operation state to "own station failure switching" and shifts to a sequence of the own station failure switching.

Meanwhile, as irregularity is detected on the transmission line side input of the B-station transponder 20b to which the receiving label expected value "BBB" corresponding to the A-station transponder 20B is set, the B-station controller 40 recognizes an occurrence of an opposite station failure. Thus, the B-station controller 40 rewrites the state of the transponder 20b to "opposite station failure". Then, the B-station controller 40 searches the table TB for a transponder 20 connected to a client device 50 of a lower priority order than the client device 50 connected to the transponder 20b of the irregular transmission line side input. As a result, if there is one of a lower priority order, the B-station controller 40 sets the operation state of the table TB to "opposite station failure switching" and shifts to a sequence of the opposite station failure switching.

FIG. 19 illustrates a state of the optical transmission device following FIG. 18. The A-station controller 40 having shifted to the sequence of the own station failure switching in FIG. 19 controls the optical switch unit 30, turns the connection between the transponder 20B being in failure and the client device of the priority order "2" off, and rewrites the switch state of the transponder 20B to "OFF" in the table TB. As input and output to and from the transponder 20B breaks off for certain, the B-station controller 40 can shift to the sequence of the opposite station failure switching at this moment even if failing to recognize the occurrence of the opposite station failure.

FIG. 20 illustrates a state of the optical transmission device following FIG. 19. The B-station controller 40 having shifted to the opposite station failure switching sequence in FIG. 20 rewrites the transmission label "fff" of the table TB of the transponder 20f connected to one of the client devices 50 of a lower priority order than the priority order "2", e.g., the client device 50 of the present lowest priority order "6", to the transmission label "bbb" of the transponder 20b in the state of irregular transmission line side input. Thus, an optical signal having the transmission label "bbb" corresponding to the priority order "2" is provided from the B-station transponder 20f, wavelength division multiplexed with a WDM signal by the wavelength division multiplex unit 10 and transmitted to the transmission line OTL.

On the A-station optical transmission device, then, the transponder 20F corresponding to the lowest priority order "6" is provided with the optical signal including the receiving label "bbb" corresponding to the priority order "2". Hence, the A-station controller 40 rewrites the receiving label of the transponder 20F to "bbb" in the table TB. As a result, as the receiving label "bbb" of the optical signal provided to the transponder 20F differs from the receiving label expected value "fff" in the table TB, the A-station controller 40 detects a label disagreement. The A-station controller 40 thereby identifies the B-station side as being aware of the opposite station failure.

After the controllers 40 of both of the stations recognize the failure occurrence as described above, a similar process as illustrated in and after FIG. 5 is performed so that the optical signal of the priority order "2" can be substituted, transmitted and received, and saved by the transponders 20F and 20ƒ having been charge of the priority order "6".

Figure 21:
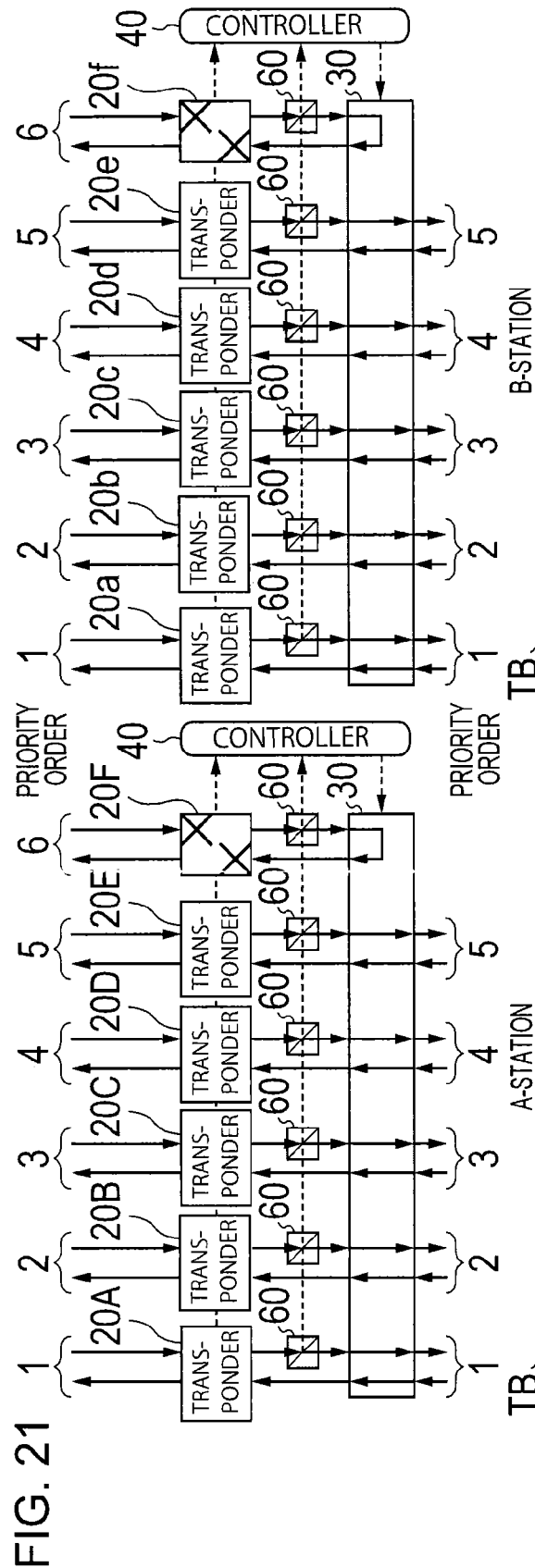
FIG. 21 illustrates an optical transmission device equipped with a backup transponder in normal operation.
Figure 22:
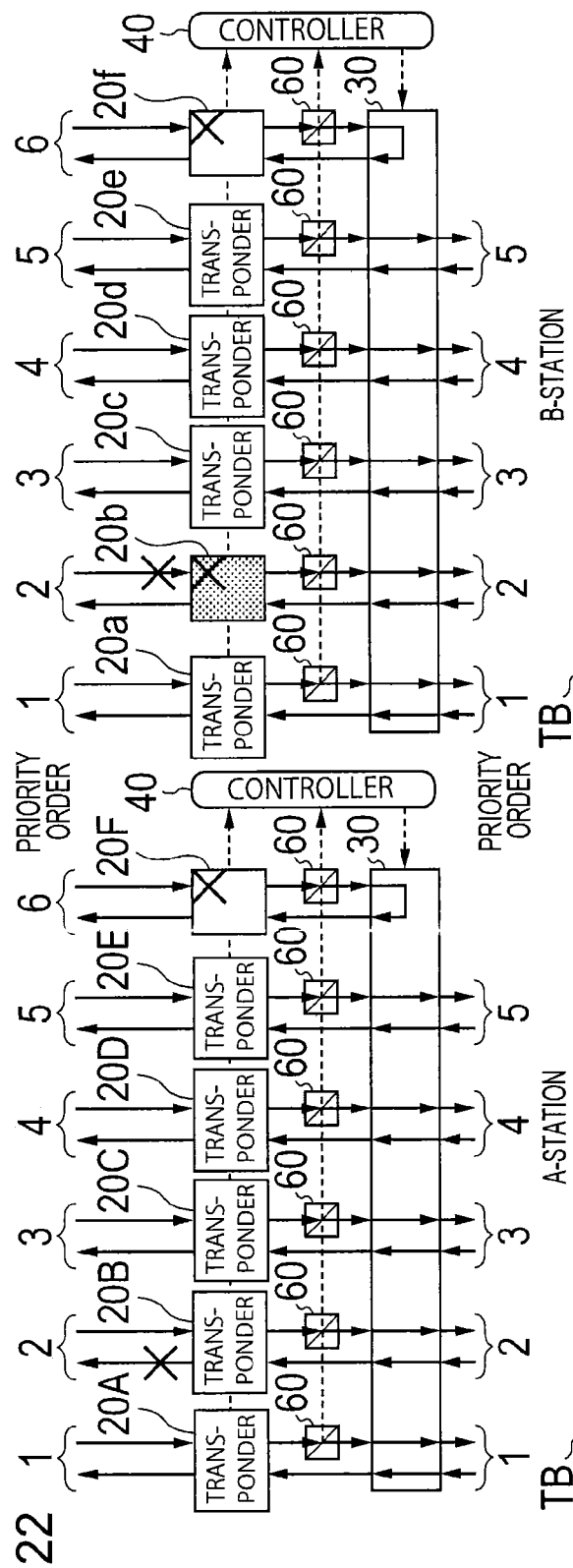
FIG. 22 illustrates a state of the optical transmission device illustrated in FIG. 21 in failure.
Figure 23:
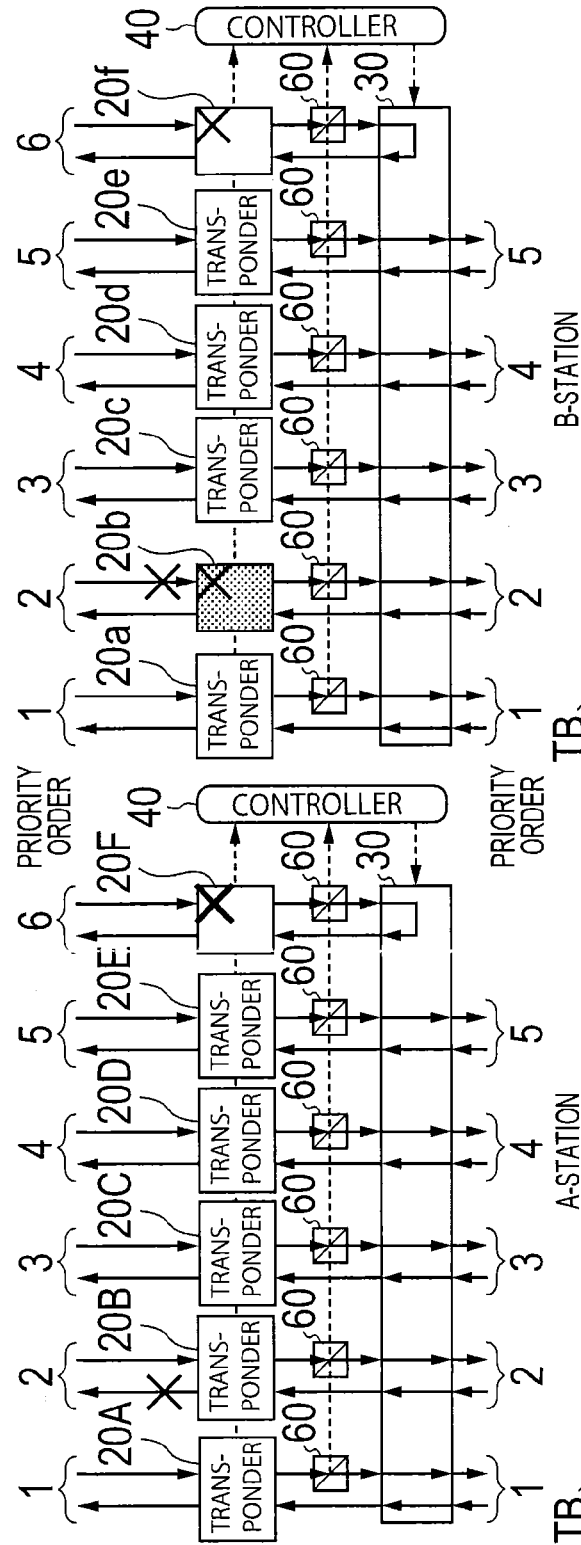
FIG. 23 illustrates a state of the optical transmission device following FIG. 22.

FIGS. 21-23 each show a redundant configuration provided with a backup transponder 20. The A-station optical transmission device having the transponders 20A-F illustrated on the left of the drawings and the B-station optical transmission device having the transponders 20a-ƒ illustrated on the right of the drawings are one-to-one connected through the transmission line OTL, similarly as described above. Among the transponders 20A-F and 20a-ƒ of both of the stations in this case, the transponders 20F and 20ƒ of the lowest priority order "6" are provided as the backups.

FIG. 21 illustrates an optical transmission device equipped with a backup transponder in normal operation. In this case, as illustrated in FIG. 21, the switch states of the backup transponders 20F and 20ƒ are set to "return" and the states are initially set to "waiting".

FIG. 22 illustrates a state of the optical transmission device illustrated in FIG. 21 in failure. Assume that a failure occurs on the transmission line side input of the transponder 20B connected to the client device 50 of the priority order "2" of the A-station in FIG. 22, similarly as illustrated in FIG. 3. At this moment, though, the controller 40 of the A-station optical transmission device is not aware of the failure occurrence in the own station. Concerning the optical transmission device of the B-station, meanwhile, as irregularity occurs on the transmission line side input of the transponder 20b supposed to receive the optical signal of the A-station transponder 20B, the B-station controller 40 can recognize the occurrence of the opposite station failure. Thus, the B-station controller 40 rewrites the state of the transponder 20b to "opposite station failure" in the table TB. Then, the B-station controller 40 searches the table TB for a transponder 20 corresponding to a priority order lower than the priority order "2". As there is the backup transponder 20ƒ as the priority order "6" in this case, the B-station controller 40 sets the operation state of the table TB to "opposite station failure switching", and shifts to a sequence of the opposite station failure switching by using the backup transponder 20ƒ.

FIG. 23 illustrates a state of the optical transmission device following FIG. 22. The B-station controller 40 having shifted to the sequence of the opposite station failure switching in FIG. 23 rewrites the transmission label "fff" of the backup transponder 20ƒ to the transmission label "bbb" of the transponder 20b in the state of the irregular transmission line side input, and rewrites the state of the backup transponder 20ƒ to "normal". Thus, an optical signal having the transmission label "bbb" corresponding to the priority order "2" is provided from the B-station transponder 20ƒ, wavelength division multiplexed with a WDM signal by the wavelength division multiplex unit 10 and transmitted to the transmission line OTL.

On the A-station, then, the backup transponder 20F corresponding to the lowest priority order "6" is provided with the optical signal including the receiving label "bbb" corresponding to the priority order "2". Hence, the A-station controller 40 rewrites the receiving label of the transponder 20F to "bbb" in the table TB. As a result, as the receiving label "bbb" of the optical signal provided to the transponder 20F differs from the receiving label expected value "fff" of the transponder 20F in the table TB, the A-station controller 40 detects a label disagreement. The A-station controller 40 thereby identifies the transponder 20B corresponding to the priority order "2" supposed to have the receiving label expected value "bbb" as being in failure, rewrites the state of the transponder 20B to "own station failure" in the table TB and rewrites the state of the transponder 20F to normal. Then, the A-station controller 40 sets the operation state of the table TB to "own station failure switching" and shifts to a sequence of the own station failure switching.

After the controllers 40 of both of the stations recognize the failure occurrence as described above, a similar process as illustrated in and after FIG. 5 is performed so that the optical signal of the priority order "2" can be substituted, transmitted and received, and saved by the transponders 20F and 20ƒ having been in charge of the priority order "6". As the transponders 20F and 20ƒ are provided as the backups in this case, the number of the transponders 20 of the optical transmission device is greater than that of the client device 50 by one. All the transponders can thereby be substituted and saved at least once.

An example of a process for restoring the optical transmission device to the state before the failure occurrence after the cause of the failure is resolved for the transponder 20 in failure substituted and saved as described above will be explained.

As illustrated in FIG. 14, e.g., the transponders 20A and 20B are in failure on the A-station, and assume that the failure is removed by means of an exchange of an optical fiber on the transmission line side and so on. In that case, the A-station controller 40 having resolved the failure resets the table TB and restores it to the initial state illustrated in FIG. 2. Then, the optical switch unit 30 is switched so that the optical signals of the priority order "1, 2, 5, 6" for which optical paths have been changed by the substitute-and-save process are input and output to and from the transponders initially in charge of them, i.e., the priority order "1"=the transponder 20A, the priority order "2"=the transponder 20B, the priority order "5"=the transponder 20E, and the priority order "6"=the transponder 20F. Thus, if the table is reset by the A-station controller 40, the B-station controller 40 detects irregular transmission line side inputs concerning the transponders 20a, b, e and ƒ at the same time.

Upon detecting irregularity concerning every transponder 20 for which the connection has been changed owing to the failure as described above, the B-station controller 40 identifies the opposite station as having performed a reset process for restoration and similarly resets the own table TB. The table TB of the B-station thereby returns to the initial state illustrated in FIG. 2. After that, optical communication is performed in the initial normal state illustrated in FIG. 2.

Incidentally, the B-station controller 40 resets the table in a case where irregularity occurs only on the transponder 20 for which the connection path has been changed owing to the failure. If irregularity occurs on all the transponders 20 including the transponders 20 for which the connection path has not been changed (the priority order "3, 4" illustrated in FIG. 14), the B-station controller 40 never resets the table as another failure such as fiber snapping of the transmission line may possibly have occurred in such a case.

According to the embodiment, a transmission label of a certain transponder is intentionally rewritten and a WDM signal is multiplexed with an optical signal including the changed transmission label and transmitted to an opposite station so that a label disagreement is intentionally caused to occur on an opposite station, and the own and opposite stations can mutually recognize a failure occurrence.

A label change transponder which rewrites the transmission label can be a transponder corresponding to lower priority than a client device connected to a transponder in failure. Then, if the transmission label of the label change transponder is rewritten to a value of a transmission label originally set to the transponder in failure, the transponder in failure and the substitute transponder to be used as a substitute for this transponder can be notified to the optical transmission device of the opposite station. Thus, the own and opposite stations can mutually recognize the failure occurrence, and can cooperate with each other for performing a substitute-and-save process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical transmission device comprising:
    a wavelength multiplexing/demultiplexing unit operable to multiplex a plurality of optical signals of different wavelengths from a plurality of first client devices, respectively, into a first wavelength division multiplexing (WDM) signal and to transmit the first WDM signal to a transmission line, and to demultiplex a second WDM signal received from the transmission line into a plurality of optical signals of respective wavelengths from a plurality of second client devices, respectively, that had been multiplexed into the second WDM signal, each of the first client devices having a priority order;
    a plurality of transponders for converting wavelengths of the optical signals from the plurality of first client devices, respectively, to provide the wavelength multiplexing/demultiplexing unit with the wavelength-converted optical signals to be multiplexed into the first WDM signal, and converting wavelengths of the optical signals from the second plurality of client devices, respectively, in the second WDM signal after being demultiplexed by the wavelength multiplexing/demultiplexing unit;
    an optical switch unit for switching connection paths between the transponders and the first client devices; and
    a controller for switching the optical switch unit, upon an irregular optical signal from the demultiplexed second WDM signal being received by one of the transponders, to connect another transponder connected to a first client device of lower priority order than the priority order of the first client device connected to the transponder in which the irregular optical signal was received,
        the controller including a table in which a plurality of items at least including priority order, a transmission label, a receiving label and a receiving label expected value correspond to the respective transponders,
        the controller rewriting the transmission label of the transponder corresponding to the first client device of the lower priority order than the priority order of the first client device connected to the transponder that received the irregular optical signal,
        the controller controlling the label-changed transponder for which the transmission label has been rewritten so that the label-changed transponder provides the wavelength multiplexing/demultiplexing unit with the optical signal including the rewritten transmission label,
    wherein, when the optical signal provided from the wavelength multiplexing/demultiplexing unit is irregular on the label-changed transponder after the label-changed transponder provides the wavelength multiplexing/demultiplexing unit with the optical signal including the rewritten transmission label, the controller restores the transmission label of the label-changed transponder to the transmission label before being rewritten in the table, and switches the optical switch unit so as to connect the transponder for which the transmission label has been restored to the transmission label before being rewritten to the client device connected to the transponder that received the irregular optical signal.

2. The optical transmission device according to claim 1, wherein the controller resets the table to a state before the failure occurs upon detecting, after switching the optical switch unit, irregularity concerning all the transponders for which the optical switch unit has been switched.

3. The optical transmission device according to claim 1, wherein the controller switches the optical switch unit, upon an irregularly-labeled transponder for which the receiving label differs from the receiving label expected value occurring in the table, so as to turn a connection between the irregularly-labeled transponder and the respective client device off.

4. The optical transmission device according to claim 3, wherein
    when the receiving label of the irregularly-labeled transponder agrees with the receiving label expected value again in the table after the connection between the irregularly-labeled transponder and the client device is turned off, the controller switches the optical switch unit so as to connect the irregularly-labeled transponder to the client device that has been connected to the transponder to which the receiving label being different from the receiving label expected value is originally set.

5. The optical transmission device according to claim 1, wherein
    when the failure occurs on an output of one of the transponders to the respective client device or on hardware of one of the transponders, the controller switches the optical switch unit so as to turn a connection between the transponder in failure and the respective client device off.

6. The optical transmission device according to claim 1, wherein the number of the transponders is greater than the number of the client devices.

7. An optical transmission system comprising:
    a first optical transmission device as an own station; and
    a second optical transmission device as an opposite station being connected with the first optical transmission device, each of the first and the second optical transmission devices including:
        a wavelength multiplexing/demultiplexing unit operable to multiplex a plurality of optical signals of different wavelengths from a plurality of first client devices, respectively, into a first wavelength division multiplexing (WDM) signal and to transmit the first WDM signal to a transmission line, and to demultiplex a second WDM signal received from the transmission line into a plurality of optical signals of respective wavelengths from a plurality of second client devices, respectively, that had been multiplexed into the second WDM signal, each of the first client devices having a priority order;

a plurality of transponders for converting wavelengths of the optical signals from the plurality of first client devices, respectively, to provide the wavelength multiplexing/demultiplexing unit with the wavelength-converted optical signals to be multiplexed into the first WDM signal, and for converting wavelengths of the optical signals from the second plurality of client devices, respectively, in the second WDM signal after being demultiplexed by the wavelength multiplexing/demultiplexing unit;

an optical switch unit for switching connection paths between the transponders and the first client devices; and a controller for switching the optical switch unit, upon an irregular optical signal from the demultiplexed second WDM signal being received by one of the transponders, to connect another transponder of lower priority order than the priority order of the transponder in which the irregular optical signal was received to a first client device connected to the transponder in which the irregular optical signal was received, and including a table in which a plurality of items at least including priority order, a transmission label, a receiving label and a receiving label expected value correspond to the respective transponders, upon the optical signal provided by the wavelength multiplexing/demultiplexing unit to one of the transponders being irregular, the controller of the own station rewriting the transmission label of the transponder corresponding to the client device of lower priority order than priority order of the first client device connected to the transponder in which the irregular optical signal was received, the controller of the own station controlling the label-changed transponder for which the transmission label has been rewritten so that the label-changed transponder provides the wavelength division multiplex unit with the optical signal including the rewritten transmission label, upon an irregularly-labeled transponder for which the receiving label differs from the receiving label expected value occurring in the table, the controller of the opposite station switching the optical switch unit so as to turn a connection between the irregularly-labeled transponder and the first client device off, upon receiving the irregular optical signal on the label-changed transponder, the controller of the own station restoring the transmission label of the label-changed transponder to the transmission label before being rewritten in the table, the controller of the own station switching the optical switch unit so as to connect the transponder for which the transmission label has been restored to the one before being rewritten to the first client device having been connected to the transponder in which the irregular optical signal was received, and upon the receiving label of the irregularly-labeled transponder agreeing with the receiving label expected value again after the connection between the irregularly-labeled transponder and the first client device is turned off, the controller of the opposite station switching the optical switch unit so as to connect the transponder to the first client device connected to a transponder to which the receiving label being different from the receiving label expected value is originally set.

8. The optical transmission system according to claim 7, wherein the controller of the own station resets the table to a state before the failure occurs upon detecting, after switching the optical switch unit, irregularity concerning all the transponders for which the optical switch unit has been switched.

9. An optical transmission system comprising:

a first optical transmission device as an own station; and a second optical transmission device as an opposite station being connected with the first optical transmission device, each of the first and the second optical transmission devices including:

a wavelength multiplexing/demultiplexing unit operable to multiplex a plurality of optical signals of different wavelengths from a plurality of first client devices, respectively, into a first wavelength division multiplexing (WDM) signal and to transmit the first WDM signal to a transmission line, and to demultiplex a second WDM signal received from the transmission line into a plurality of optical signals of respective wavelengths from a plurality of second client devices, respectively, that had been multiplexed into the second WDM signal, each of the first client devices having a priority order;

a plurality of transponders for converting wavelengths of the optical signals from the plurality of first client devices, respectively, to provide the wavelength multiplexing/demultiplexing unit with the wavelength-converted optical signals to be multiplexed into the first WDM signal, and converting wavelengths of the optical signals from the second plurality of client devices, respectively, in the second WDM signal after being demultiplexed by the wavelength multiplexing/demultiplexing unit;

an optical switch unit for switching connection paths between the transponders and the first client devices; and a controller for switching the optical switch unit, upon an irregular optical signal from the demultiplexed second WDM signal being received by one of the transponders, to connect another transponder of lower priority order than the priority order of the transponder in which the irregular optical signal was received to a first client device connected to the transponder which the irregular optical signal was received, and including a table in which a plurality of items at least including priority order, a transmission label, a receiving label and a receiving label expected value correspond to the respective transponders, upon the failure occurring on an output of one of the transponders to the first client device or on hardware of one of the transponders, the controller of the own station switching the optical switch unit so as to turn a connection between the transponder in which the irregular optical signal was received and the first client device off, upon the optical signal provided by the wavelength multiplexing/demultiplexing unit to one of the transponders being irregular, the controller of the opposite station rewriting the transmission label of the transponder corresponding to the client device of lower priority order than priority order of the first client device connected to the transponder in which the irregular optical signal was received, the controller of the opposite station controlling the label-changed transponder for which the transmission label has been rewritten so that the label-changed transponder provides the wavelength division multiplex unit with the optical signal including the rewritten transmission label, upon an irregularly-labeled transponder for which the receiving label differs from the receiving label expected value occurs in the table, the controller of the own station switching the optical switch unit so as to turn a connection between the irregularly-labeled transponder and the first client device off, upon receiving the irregular optical signal the label-changed transponder, the controller of the opposite station restoring the transmission label of the label-changed transponder to the transmission label before being rewritten in the table, the controller of the opposite station switching the optical switch unit so as to connect the transponder for which the transmission label has been restored to the one before being rewritten to the first client device having been connected to the transponder on which the failure occurred, and upon the receiving label of the irregularly-labeled transponder agreeing with the receiving label expected value again after the connection between the irregularly-labeled transponder and the first client device is turned off, the controller of the own station switching the optical switch unit so as to connect the transponder to the first client device connected to a transponder to which the receiving label being different from the receiving label expected value is originally set.

10. The optical transmission system according to claim 9, wherein the controller of the opposite station resets the table to a state before the failure occurs upon detecting, after switching the optical switch unit, irregularity concerning all the transponders for which the optical switch unit has been switched.

* * * * *